US012595201B2

(12) United States Patent
Brennan et al.

(10) Patent No.: US 12,595,201 B2
(45) Date of Patent: Apr. 7, 2026

(54) COLD-FORM GLASS LAMINATION TO A DISPLAY

(71) Applicant: CORNING INCORPORATED, Corning, NY (US)

(72) Inventors: Michael Timothy Brennan, Painted Post, NY (US); Atul Kumar, Horseheads, NY (US); Michael James McFarland, Corning, NY (US); Yawei Sun, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 718 days.

(21) Appl. No.: 17/856,410

(22) Filed: Jul. 1, 2022

(65) Prior Publication Data

US 2022/0332624 A1 Oct. 20, 2022

Related U.S. Application Data

(63) Continuation of application No. 16/344,637, filed as application No. PCT/US2017/058010 on Oct. 24, 2017, now Pat. No. 11,384,001.

(Continued)

(51) Int. Cl.
*C03B 23/023* (2006.01)
*B32B 17/10* (2006.01)
(Continued)

(52) U.S. Cl.
CPC .... *C03B 23/0235* (2013.01); *B32B 17/10045* (2013.01); *B32B 17/10091* (2013.01); *C03B 23/0307* (2013.01); *C03C 27/06* (2013.01)

(58) Field of Classification Search
CPC ............ C03B 23/0235; C03B 23/0307; C03B 23/023; C03B 23/0256; C03B 23/0305;
(Continued)

(56) References Cited

U.S. PATENT DOCUMENTS 2,068,030 A 1/1937 Lieser
2,608,030 A 8/1952 Jendrisak
(Continued)

FOREIGN PATENT DOCUMENTS

CN 1111906 A 11/1995
CN 1587132 A 3/2005
(Continued)

OTHER PUBLICATIONS

Lancker et al., "Material Properties of a Structural Silicone for Linear Adhesive Glass-Metal Connections", Challenging Glass 5—Conference on Architectural and Structural Applications of Glass, Ghent Univ. Jun. 2016. (Year: 2016).*
(Continued)

*Primary Examiner* — Christopher W Raimund
(74) *Attorney, Agent, or Firm* — Daniel J. Greenhalgh

(57) ABSTRACT

In some embodiments, a process comprises fixing a first portion of a flexible glass substrate into a first fixed shape with a first rigid support structure and attaching a first display to the first portion of the flexible glass substrate or to the first rigid support structure. After fixing the first portion and attaching the first display, and while maintaining the first fixed shape of the first portion of the flexible glass substrate and the attached first display, cold-forming a second portion of the flexible glass substrate to a second fixed shape and fixing the second portion of the flexible glass substrate into the second fixed shape with a second rigid support structure.

17 Claims, 21 Drawing Sheets

Related U.S. Application Data

(60) Provisional application No. 62/412,542, filed on Oct. 25, 2016.

(51) Int. Cl.
*C03B 23/03* (2006.01)
*C03C 27/06* (2006.01)

(58) Field of Classification Search
CPC .............. C03B 27/00; B32B 17/10045; B32B 17/10091; B32B 17/10036; B32B 17/10743; B32B 17/10761; B32B 17/1077; B32B 17/10788; B32B 17/06; B32B 2457/20; C03C 27/06; C03C 27/00; C03C 1/004; C03C 3/087; C03C 27/10; C03C 17/002; Y02P 40/57; G06F 1/1601; G09F 9/30; G02F 1/1333; G02F 1/133302
See application file for complete search history.

(56) References Cited

U.S. PATENT DOCUMENTS

| | | | |
|---|---|---|---|
| 3,197,903 A | 8/1965 | Walley | |
| 3,338,696 A | 8/1967 | Dockerty | |
| 3,582,456 A | 6/1971 | Stolki | |
| 3,682,609 A | 8/1972 | Dockerty | |
| 3,753,840 A | 8/1973 | Plumat | |
| 3,778,335 A | 12/1973 | Boyd | |
| 3,790,430 A | 2/1974 | Mochel | |
| 3,799,817 A | 3/1974 | Laethem | |
| 4,147,527 A | 4/1979 | Bystrov et al. | |
| 4,238,265 A | 12/1980 | Deminet | |
| 4,445,953 A | 5/1984 | Hawk | |
| 4,455,338 A | 6/1984 | Henne | |
| 4,802,903 A | 2/1989 | Kuster et al. | |
| 4,859,636 A | 8/1989 | Aratani et al. | |
| 4,899,507 A | 2/1990 | Mairlot | |
| 4,969,966 A | 11/1990 | Norman | |
| 4,985,099 A | 1/1991 | Mertens et al. | |
| 5,108,480 A | 4/1992 | Sugiyama | |
| 5,154,117 A | 10/1992 | Didelot et al. | |
| 5,173,102 A | 12/1992 | Weber et al. | |
| 5,245,468 A | 9/1993 | Demiryont et al. | |
| 5,250,146 A | 10/1993 | Horvath | |
| 5,264,058 A | 11/1993 | Hoagland et al. | |
| 5,300,184 A | 4/1994 | Masunaga | |
| 5,711,119 A | 1/1998 | Cornils et al. | |
| 5,897,937 A | 4/1999 | Cornils et al. | |
| 6,044,662 A | 4/2000 | Morin | |
| 6,086,983 A | 7/2000 | Yoshizawa | |
| 6,101,748 A | 8/2000 | Cass et al. | |
| 6,242,931 B1 | 6/2001 | Hembree et al. | |
| 6,265,054 B1 | 7/2001 | Bravet et al. | |
| 6,270,605 B1 | 8/2001 | Doerfler | |
| 6,274,219 B1 | 8/2001 | Schuster et al. | |
| 6,287,674 B1 | 9/2001 | Verlinden et al. | |
| 6,302,985 B1 | 10/2001 | Takahashi et al. | |
| 6,305,492 B1 | 10/2001 | Oleiko et al. | |
| 6,332,690 B1 | 12/2001 | Murofushi | |
| 6,387,515 B1 | 5/2002 | Joret et al. | |
| 6,420,800 B1 | 7/2002 | Levesque et al. | |
| 6,426,138 B1 | 7/2002 | Narushima et al. | |
| 6,582,799 B1 | 6/2003 | Brown et al. | |
| 6,620,365 B1 | 9/2003 | Odoi et al. | |
| 6,816,225 B2 | 11/2004 | Colgan et al. | |
| 6,903,871 B2 | 6/2005 | Page | |
| 7,297,040 B2 | 11/2007 | Chang et al. | |
| 7,375,782 B2 | 5/2008 | Yamazaki et al. | |
| 7,478,930 B2 | 1/2009 | Choi | |
| 7,489,303 B1 | 2/2009 | Pryor | |
| 7,542,302 B1 | 6/2009 | Curnalia et al. | |
| 7,750,821 B1 | 7/2010 | Taborisskiy et al. | |
| 7,955,470 B2 | 6/2011 | Kapp et al. | |
| 8,298,431 B2 | 10/2012 | Chwu et al. | |
| 8,344,369 B2 | 1/2013 | Yamazaki et al. | |
| 8,521,955 B2 | 8/2013 | Arulambalam et al. | |
| 8,549,885 B2 | 10/2013 | Dannoux et al. | |
| 8,586,492 B2 | 11/2013 | Barefoot et al. | |
| 8,652,978 B2 | 2/2014 | Dejneka et al. | |
| 8,692,787 B2 | 4/2014 | Imazeki | |
| 8,702,253 B2 | 4/2014 | Lu et al. | |
| 8,765,262 B2 | 7/2014 | Gross | |
| 8,814,372 B2 | 8/2014 | Vandal et al. | |
| 8,833,106 B2 | 9/2014 | Dannoux et al. | |
| 8,912,447 B2 | 12/2014 | Leong et al. | |
| 8,923,693 B2 | 12/2014 | Yeates | |
| 8,962,084 B2 | 2/2015 | Brackley et al. | |
| 8,967,834 B2 | 3/2015 | Timmerman et al. | |
| 8,969,226 B2 | 3/2015 | Dejneka et al. | |
| 8,978,418 B2 | 3/2015 | Balduin et al. | |
| 9,007,226 B2 | 4/2015 | Chang | |
| 9,061,934 B2 | 6/2015 | Bisson et al. | |
| 9,090,501 B2 | 7/2015 | Okahata et al. | |
| 9,109,881 B2 | 8/2015 | Roussev et al. | |
| 9,140,543 B1 | 9/2015 | Allan et al. | |
| 9,156,724 B2 | 10/2015 | Gross | |
| 9,223,162 B2 | 12/2015 | Deforest et al. | |
| 9,240,437 B2 | 1/2016 | Shieh et al. | |
| 9,278,500 B2 | 3/2016 | Filipp | |
| 9,278,655 B2 | 3/2016 | Jones et al. | |
| 9,290,413 B2 | 3/2016 | Dejneka et al. | |
| 9,346,703 B2 | 5/2016 | Bookbinder et al. | |
| 9,346,706 B2 | 5/2016 | Bazemore et al. | |
| 9,357,638 B2 | 5/2016 | Lee et al. | |
| 9,442,028 B2 | 9/2016 | Roussev et al. | |
| 9,446,723 B2 | 9/2016 | Stepanski | |
| 9,469,561 B2 | 10/2016 | Kladias et al. | |
| 9,517,967 B2 | 12/2016 | Dejneka et al. | |
| 9,573,843 B2 | 2/2017 | Keegan et al. | |
| 9,593,042 B2 | 3/2017 | Hu et al. | |
| 9,595,960 B2 | 3/2017 | Wilford | |
| 9,606,625 B2 | 3/2017 | Levesque et al. | |
| 9,617,180 B2 | 4/2017 | Bookbinder et al. | |
| 9,663,396 B2 | 5/2017 | Miyasaka et al. | |
| 9,694,570 B2 | 7/2017 | Levasseur et al. | |
| 9,700,985 B2 | 7/2017 | Kashima et al. | |
| 9,701,564 B2 | 7/2017 | Bookbinder et al. | |
| 9,720,450 B2 | 8/2017 | Choi et al. | |
| 9,724,727 B2 | 8/2017 | Domey et al. | |
| 9,802,485 B2 | 10/2017 | Masuda et al. | |
| 9,815,730 B2 | 11/2017 | Marjanovic et al. | |
| 9,821,509 B2 | 11/2017 | Kastell | |
| 9,895,975 B2 | 2/2018 | Lee et al. | |
| 9,902,640 B2 | 2/2018 | Dannoux et al. | |
| 9,931,817 B2 | 4/2018 | Rickerl | |
| 9,933,820 B2 | 4/2018 | Helot et al. | |
| 9,947,882 B2 | 4/2018 | Zhang et al. | |
| 9,955,602 B2 | 4/2018 | Wildner et al. | |
| 9,957,190 B2 | 5/2018 | Finkeldey et al. | |
| 9,963,374 B2 | 5/2018 | Jouanno et al. | |
| 9,972,645 B2 | 5/2018 | Kim | |
| 9,975,801 B2 | 5/2018 | Maschmeyer et al. | |
| 9,992,888 B2 | 6/2018 | Moon et al. | |
| 10,005,246 B2 | 6/2018 | Stepanski | |
| 10,017,033 B2 | 7/2018 | Fisher et al. | |
| 10,042,391 B2 | 8/2018 | Yun et al. | |
| 10,074,824 B2 | 9/2018 | Han et al. | |
| 10,086,762 B2 | 10/2018 | Uhm | |
| 10,131,118 B2 | 11/2018 | Kang et al. | |
| 10,140,018 B2 | 11/2018 | Kim et al. | |
| 10,153,337 B2 | 12/2018 | Lee et al. | |
| 10,175,802 B2 | 1/2019 | Boggs et al. | |
| 10,211,416 B2 | 2/2019 | Jin et al. | |
| 10,222,825 B2 | 3/2019 | Wang et al. | |
| 10,273,184 B2 | 4/2019 | Garner et al. | |
| 10,303,223 B2 | 5/2019 | Park et al. | |
| 10,303,315 B2 | 5/2019 | Jeong et al. | |
| 10,326,101 B2 | 6/2019 | Oh et al. | |
| 10,328,865 B2 | 6/2019 | Jung | |
| 10,343,377 B2 | 7/2019 | Levasseur et al. | |
| 10,347,700 B2 | 7/2019 | Yang et al. | |
| 10,377,656 B2 | 8/2019 | Dannoux et al. | |

(56) References Cited

U.S. PATENT DOCUMENTS

| | | | |
|---|---|---|---|
| 10,421,683 B2 | 9/2019 | Schillinger et al. |
| 10,427,383 B2 | 10/2019 | Levasseur et al. |
| 10,444,427 B2 | 10/2019 | Bookbinder et al. |
| 10,483,210 B2 | 11/2019 | Gross et al. |
| 10,500,958 B2 | 12/2019 | Cho et al. |
| 10,549,704 B2 | 2/2020 | Mcfarland |
| 10,606,395 B2 | 3/2020 | Boggs et al. |
| 10,649,267 B2 | 5/2020 | Tuan et al. |
| 10,712,850 B2 | 7/2020 | Brandao et al. |
| 10,732,753 B2 | 8/2020 | Boggs et al. |
| 10,788,707 B2 | 9/2020 | Ai et al. |
| 10,976,607 B2 | 4/2021 | Huang et al. |
| 11,016,590 B2 | 5/2021 | Brandao et al. |
| 2002/0039229 A1 | 4/2002 | Hirose et al. |
| 2004/0026021 A1 | 2/2004 | Groh et al. |
| 2004/0069770 A1 | 4/2004 | Cary et al. |
| 2004/0107731 A1 | 6/2004 | Doehring et al. |
| 2004/0258929 A1 | 12/2004 | Glaubitt et al. |
| 2005/0178158 A1 | 8/2005 | Moulding et al. |
| 2006/0227125 A1 | 10/2006 | Wong et al. |
| 2007/0188871 A1 | 8/2007 | Fleury et al. |
| 2007/0195419 A1 | 8/2007 | Tsuda et al. |
| 2007/0210621 A1 | 9/2007 | Barton et al. |
| 2007/0221313 A1 | 9/2007 | Franck et al. |
| 2007/0223121 A1 | 9/2007 | Franck et al. |
| 2007/0291384 A1 | 12/2007 | Wang |
| 2008/0031991 A1 | 2/2008 | Choi et al. |
| 2008/0093753 A1 | 4/2008 | Schuetz |
| 2008/0285134 A1 | 11/2008 | Closset et al. |
| 2008/0303976 A1 | 12/2008 | Nishizawa et al. |
| 2009/0046240 A1 | 2/2009 | Bolton |
| 2009/0096937 A1 | 4/2009 | Bauer et al. |
| 2009/0096965 A1 | 4/2009 | Nagata |
| 2009/0101208 A1 | 4/2009 | Vandal et al. |
| 2009/0117332 A1 | 5/2009 | Ellsworth et al. |
| 2009/0179840 A1 | 7/2009 | Tanaka et al. |
| 2009/0185127 A1 | 7/2009 | Tanaka et al. |
| 2009/0201443 A1 | 8/2009 | Sasaki et al. |
| 2009/0311497 A1 | 12/2009 | Aoki |
| 2010/0000259 A1 | 1/2010 | Ukrainczyk et al. |
| 2010/0031590 A1 | 2/2010 | Buchwald et al. |
| 2010/0065342 A1 | 3/2010 | Shaikh |
| 2010/0103138 A1 | 4/2010 | Huang et al. |
| 2010/0182143 A1 | 7/2010 | Lynam |
| 2010/0245253 A1 | 9/2010 | Rhyu et al. |
| 2010/0247977 A1 | 9/2010 | Tsuchiya et al. |
| 2011/0057465 A1 | 3/2011 | Beau et al. |
| 2011/0078832 A1 | 3/2011 | Koecher et al. |
| 2011/0148267 A1 | 6/2011 | Mcdaniel et al. |
| 2012/0050975 A1 | 3/2012 | Garelli et al. |
| 2012/0111056 A1 | 5/2012 | Prest |
| 2012/0128952 A1 | 5/2012 | Miwa et al. |
| 2012/0134025 A1 | 5/2012 | Hart |
| 2012/0144866 A1 | 6/2012 | Liu et al. |
| 2012/0152897 A1 | 6/2012 | Cheng et al. |
| 2012/0196110 A1 | 8/2012 | Murata et al. |
| 2012/0202030 A1 | 8/2012 | Kondo et al. |
| 2012/0218640 A1 | 8/2012 | Gollier et al. |
| 2012/0263945 A1 | 10/2012 | Yoshikawa |
| 2012/0280368 A1 | 11/2012 | Garner et al. |
| 2012/0320509 A1 | 12/2012 | Kim et al. |
| 2013/0020007 A1 | 1/2013 | Niiyama et al. |
| 2013/0033885 A1 | 2/2013 | Oh et al. |
| 2013/0070340 A1 | 3/2013 | Shelestak et al. |
| 2013/0081428 A1 | 4/2013 | Liu et al. |
| 2013/0088441 A1 | 4/2013 | Chung et al. |
| 2013/0120850 A1 | 5/2013 | Lambert et al. |
| 2013/0186141 A1 | 7/2013 | Henry |
| 2013/0209824 A1 | 8/2013 | Sun et al. |
| 2013/0279188 A1 | 10/2013 | Entenmann et al. |
| 2013/0314642 A1 | 11/2013 | Timmerman et al. |
| 2013/0329346 A1 | 12/2013 | Dannoux et al. |
| 2013/0330495 A1 | 12/2013 | Maatta et al. |
| 2014/0014260 A1 | 1/2014 | Chowdhury et al. |
| 2014/0036428 A1 | 2/2014 | Seng et al. |
| 2014/0065374 A1 | 3/2014 | Tsuchiya et al. |
| 2014/0141206 A1 | 5/2014 | Gillard et al. |
| 2014/0146538 A1 | 5/2014 | Zenker et al. |
| 2014/0153234 A1 | 6/2014 | Knoche et al. |
| 2014/0153894 A1 | 6/2014 | Jenkins et al. |
| 2014/0168153 A1 | 6/2014 | Deichmann et al. |
| 2014/0168546 A1 | 6/2014 | Magnusson et al. |
| 2014/0234581 A1 | 8/2014 | Immerman et al. |
| 2014/0308464 A1 | 10/2014 | Levasseur et al. |
| 2014/0312518 A1 | 10/2014 | Levasseur et al. |
| 2014/0333848 A1 | 11/2014 | Chen |
| 2014/0340609 A1 | 11/2014 | Taylor et al. |
| 2015/0015807 A1 | 1/2015 | Franke et al. |
| 2015/0072129 A1 | 3/2015 | Okahata et al. |
| 2015/0077429 A1 | 3/2015 | Eguchi et al. |
| 2015/0166394 A1 | 6/2015 | Marjanovic et al. |
| 2015/0168768 A1 | 6/2015 | Nagatani |
| 2015/0177443 A1 | 6/2015 | Faecke et al. |
| 2015/0210588 A1 | 7/2015 | Chang et al. |
| 2015/0246424 A1 | 9/2015 | Venkatachalam et al. |
| 2015/0246507 A1 | 9/2015 | Brown et al. |
| 2015/0274585 A1 | 10/2015 | Rogers et al. |
| 2015/0322270 A1 | 11/2015 | Amin et al. |
| 2015/0336357 A1 | 11/2015 | Kang et al. |
| 2015/0351272 A1 | 12/2015 | Wildner et al. |
| 2015/0357387 A1 | 12/2015 | Lee et al. |
| 2016/0009066 A1 | 1/2016 | Nieber et al. |
| 2016/0009068 A1 | 1/2016 | Garner |
| 2016/0016849 A1 | 1/2016 | Allan |
| 2016/0039705 A1 | 2/2016 | Kato et al. |
| 2016/0052241 A1 | 2/2016 | Zhang |
| 2016/0066463 A1 | 3/2016 | Yang et al. |
| 2016/0081204 A1 | 3/2016 | Park et al. |
| 2016/0083282 A1 | 3/2016 | Jouanno et al. |
| 2016/0083292 A1 | 3/2016 | Tabe et al. |
| 2016/0091645 A1 | 3/2016 | Birman et al. |
| 2016/0102015 A1 | 4/2016 | Yasuda et al. |
| 2016/0113135 A1 | 4/2016 | Kim et al. |
| 2016/0207290 A1 | 7/2016 | Cleary et al. |
| 2016/0214889 A1 | 7/2016 | Garner et al. |
| 2016/0216434 A1 | 7/2016 | Shih et al. |
| 2016/0250982 A1 | 9/2016 | Fisher et al. |
| 2016/0252656 A1 | 9/2016 | Waldschmidt et al. |
| 2016/0259365 A1 | 9/2016 | Wang et al. |
| 2016/0272529 A1 | 9/2016 | Hong et al. |
| 2016/0297176 A1 | 10/2016 | Rickerl |
| 2016/0306451 A1 | 10/2016 | Isoda et al. |
| 2016/0313494 A1 | 10/2016 | Hamilton et al. |
| 2016/0354996 A1 | 12/2016 | Alder et al. |
| 2016/0355091 A1 | 12/2016 | Lee et al. |
| 2016/0355901 A1 | 12/2016 | Isozaki et al. |
| 2016/0375808 A1 | 12/2016 | Etienne et al. |
| 2017/0008377 A1 | 1/2017 | Fisher et al. |
| 2017/0021661 A1 | 1/2017 | Pelucchi |
| 2017/0066223 A1 | 3/2017 | Notsu et al. |
| 2017/0081238 A1 | 3/2017 | Jones et al. |
| 2017/0088454 A1 | 3/2017 | Fukushima et al. |
| 2017/0094039 A1 | 3/2017 | Lu |
| 2017/0115944 A1 | 4/2017 | Oh et al. |
| 2017/0158551 A1 | 6/2017 | Bookbinder et al. |
| 2017/0160434 A1 | 6/2017 | Hart et al. |
| 2017/0185289 A1 | 6/2017 | Kim et al. |
| 2017/0190152 A1 | 7/2017 | Notsu et al. |
| 2017/0197561 A1 | 7/2017 | Mcfarland |
| 2017/0213872 A1 | 7/2017 | Jinbo et al. |
| 2017/0217290 A1 | 8/2017 | Yoshizumi et al. |
| 2017/0217815 A1 | 8/2017 | Dannoux et al. |
| 2017/0240772 A1 | 8/2017 | Dohner et al. |
| 2017/0247291 A1 | 8/2017 | Hatano et al. |
| 2017/0262057 A1 | 9/2017 | Knittl et al. |
| 2017/0263690 A1 | 9/2017 | Lee et al. |
| 2017/0274627 A1 | 9/2017 | Chang et al. |
| 2017/0285227 A1 | 10/2017 | Chen et al. |
| 2017/0305786 A1 | 10/2017 | Roussev et al. |
| 2017/0327402 A1 | 11/2017 | Fujii et al. |
| 2017/0329182 A1 | 11/2017 | Privitera et al. |
| 2017/0334770 A1 | 11/2017 | Luzzato et al. |
| 2017/0349473 A1 | 12/2017 | Moriya et al. |
| 2018/0009197 A1 | 1/2018 | Gross et al. |

(56) References Cited

U.S. PATENT DOCUMENTS

| | | |
|---|---|---|
| 2018/0014420 A1 | 1/2018 | Amin et al. |
| 2018/0031743 A1 | 2/2018 | Wakatsuki et al. |
| 2018/0050948 A1 | 2/2018 | Faik et al. |
| 2018/0069053 A1 | 3/2018 | Bok |
| 2018/0072022 A1 | 3/2018 | Tsai et al. |
| 2018/0103132 A1 | 4/2018 | Prushinskiy et al. |
| 2018/0111569 A1 | 4/2018 | Faik et al. |
| 2018/0122863 A1 | 5/2018 | Bok |
| 2018/0125228 A1 | 5/2018 | Porter et al. |
| 2018/0134232 A1 | 5/2018 | Helot |
| 2018/0141850 A1 | 5/2018 | Dejneka et al. |
| 2018/0147985 A1 | 5/2018 | Brown et al. |
| 2018/0149777 A1 | 5/2018 | Brown |
| 2018/0149907 A1 | 5/2018 | Gahagan et al. |
| 2018/0164850 A1 | 6/2018 | Sim et al. |
| 2018/0186674 A1 | 7/2018 | Kumar et al. |
| 2018/0188869 A1 | 7/2018 | Boggs et al. |
| 2018/0208131 A1 | 7/2018 | Mattelet et al. |
| 2018/0208494 A1 | 7/2018 | Mattelet et al. |
| 2018/0210118 A1 | 7/2018 | Gollier et al. |
| 2018/0215125 A1 | 8/2018 | Gahagan |
| 2018/0245125 A1 | 8/2018 | Tsai et al. |
| 2018/0290438 A1 | 10/2018 | Notsu et al. |
| 2018/0304825 A1 | 10/2018 | Mattelet et al. |
| 2018/0324964 A1 | 11/2018 | Yoo et al. |
| 2018/0345644 A1 | 12/2018 | Kang et al. |
| 2018/0364760 A1 | 12/2018 | Ahn et al. |
| 2018/0374906 A1 | 12/2018 | Everaerts et al. |
| 2019/0034017 A1 | 1/2019 | Boggs et al. |
| 2019/0039352 A1 | 2/2019 | Zhao et al. |
| 2019/0039935 A1 | 2/2019 | Couillard et al. |
| 2019/0069451 A1 | 2/2019 | Myers et al. |
| 2019/0077337 A1 | 3/2019 | Gervelmeyer |
| 2019/0152831 A1 | 5/2019 | An et al. |
| 2019/0223309 A1 | 7/2019 | Amin et al. |
| 2019/0295494 A1 | 9/2019 | Wang et al. |
| 2019/0315648 A1 | 10/2019 | Kumar et al. |
| 2019/0329531 A1 | 10/2019 | Brennan et al. |
| 2020/0064535 A1 | 2/2020 | Haan et al. |
| 2020/0301192 A1 | 9/2020 | Huang et al. |
| 2021/0055599 A1 | 2/2021 | Chen et al. |

FOREIGN PATENT DOCUMENTS

| | | | |
|---|---|---|---|
| CN | 1860081 A | 11/2006 |
| CN | 101600846 A | 12/2009 |
| CN | 101684032 A | 3/2010 |
| CN | 102131743 A | 7/2011 |
| CN | 201989544 U | 9/2011 |
| CN | 102341356 A | 2/2012 |
| CN | 102464456 A | 5/2012 |
| CN | 102566841 A | 7/2012 |
| CN | 103136490 A | 6/2013 |
| CN | 103587161 A | 2/2014 |
| CN | 103794631 A | 5/2014 |
| CN | 203825589 U | 9/2014 |
| CN | 204111583 U | 1/2015 |
| CN | 104380715 A | 2/2015 |
| CN | 104656999 A | 5/2015 |
| CN | 104679341 A | 6/2015 |
| CN | 204439971 U | 7/2015 |
| CN | 204463066 U | 7/2015 |
| CN | 104843976 A | 8/2015 |
| CN | 104851889 A | 8/2015 |
| CN | 105118391 A | 12/2015 |
| CN | 105121156 A | 12/2015 |
| CN | 105511127 A | 4/2016 |
| CN | 205239166 U | 5/2016 |
| CN | 105705330 A | 6/2016 |
| CN | 106256794 A | 12/2016 |
| CN | 205905907 U | 1/2017 |
| CN | 106458683 A | 2/2017 |
| CN | 206114596 U | 4/2017 |
| CN | 206114956 U | 4/2017 |
| CN | 107613809 A | 1/2018 |

| | | |
|---|---|---|
| CN | 107757516 A | 3/2018 |
| CN | 108519831 A | 9/2018 |
| CN | 108550587 A | 9/2018 |
| CN | 108725350 A | 11/2018 |
| CN | 109135605 A | 1/2019 |
| CN | 109690662 A | 4/2019 |
| CN | 109743421 A | 5/2019 |
| DE | 4415787 A1 | 11/1995 |
| DE | 4415878 A1 | 11/1995 |
| DE | 69703490 T2 | 5/2001 |
| DE | 102004022008 A1 | 12/2004 |
| DE | 102004002208 A1 | 8/2005 |
| DE | 102009021938 A1 | 11/2010 |
| DE | 102010007204 A1 | 8/2011 |
| DE | 102013214108 A1 | 2/2015 |
| DE | 102014116798 A1 | 5/2016 |
| EP | 0076924 A2 | 4/1983 |
| EP | 0241355 A1 | 10/1987 |
| EP | 0316224 A1 | 5/1989 |
| EP | 0347049 A2 | 12/1989 |
| EP | 0418700 A1 | 3/1991 |
| EP | 0423698 A1 | 4/1991 |
| EP | 0525970 A1 | 2/1993 |
| EP | 0664210 A1 | 7/1995 |
| EP | 1013622 A1 | 6/2000 |
| EP | 1031409 A1 | 8/2000 |
| EP | 1046493 A2 | 10/2000 |
| EP | 0910721 B1 | 11/2000 |
| EP | 1647663 A1 | 4/2006 |
| EP | 2236281 A1 | 10/2010 |
| EP | 2385630 A2 | 11/2011 |
| EP | 2521118 A2 | 11/2012 |
| EP | 2852502 A2 | 4/2015 |
| EP | 2933718 A1 | 10/2015 |
| EP | 3093181 A2 | 11/2016 |
| EP | 3100854 A1 | 12/2016 |
| EP | 3118174 A1 | 1/2017 |
| EP | 3118175 A1 | 1/2017 |
| EP | 3144141 A1 | 3/2017 |
| EP | 3156286 A1 | 4/2017 |
| EP | 3189965 A1 | 7/2017 |
| EP | 3288791 A1 | 3/2018 |
| EP | 3315467 A2 | 5/2018 |
| EP | 3426614 A1 | 1/2019 |
| EP | 3532442 A1 | 9/2019 |
| FR | 2750075 A1 | 12/1997 |
| FR | 2918411 A1 | 1/2009 |
| FR | 3012073 A1 | 4/2015 |
| GB | 0805770 A | 12/1958 |
| GB | 0991867 A | 5/1965 |
| GB | 1319846 A | 6/1973 |
| GB | 2011316 A | 7/1979 |
| GB | 2281542 A | 3/1995 |
| JP | 55-154329 | 12/1980 |
| JP | 57-048082 A | 3/1982 |
| JP | 58-073681 A | 5/1983 |
| JP | 58-194751 | 11/1983 |
| JP | 59-076561 | 5/1984 |
| JP | 63-089317 A | 4/1988 |
| JP | 63-190730 | 8/1988 |
| JP | 03-059337 U | 6/1991 |
| JP | 03-228840 A | 10/1991 |
| JP | 04-119931 | 4/1992 |
| JP | 05-116972 A | 5/1993 |
| JP | 06-340029 A | 12/1994 |
| JP | 10-218630 A | 8/1998 |
| JP | 11-001349 A | 1/1999 |
| JP | 11-006029 A | 1/1999 |
| JP | 11-060293 A | 3/1999 |
| JP | 2000-260330 A | 9/2000 |
| JP | 2002-255574 A | 9/2002 |
| JP | 2003-500260 A | 1/2003 |
| JP | 2003-276571 A | 10/2003 |
| JP | 2003-321257 A | 11/2003 |
| JP | 2004-101712 A | 4/2004 |
| JP | 2004-284839 A | 10/2004 |
| JP | 2006-181936 A | 7/2006 |
| JP | 2007-188035 A | 7/2007 |
| JP | 2007-197288 A | 8/2007 |

(56)                    References Cited

FOREIGN PATENT DOCUMENTS

| JP | 2010-145731 A | 7/2010 |
| JP | 2010-256769 A | 11/2010 |
| JP | 2012-111661 A | 6/2012 |
| JP | 2013-084269 A | 5/2013 |
| JP | 2014-126564 A | 7/2014 |
| JP | 2015-502901 A | 1/2015 |
| JP | 2015-092422 A | 5/2015 |
| JP | 5748082 B2 | 7/2015 |
| JP | 5796561 B2 | 10/2015 |
| JP | 2016-500458 A | 1/2016 |
| JP | 2016-031696 A | 3/2016 |
| JP | 2016-517380 A | 6/2016 |
| JP | 2016-130810 A | 7/2016 |
| JP | 2016-144008 A | 8/2016 |
| JP | 5976561 B2 | 8/2016 |
| JP | 2016-173794 A | 9/2016 |
| JP | 2016-530204 A | 9/2016 |
| JP | 2016-203609 A | 12/2016 |
| JP | 2016-207200 A | 12/2016 |
| JP | 2017-026694 A | 2/2017 |
| JP | 6281825 B2 | 2/2018 |
| JP | 6340029 B2 | 6/2018 |
| KR | 2002-0019045 A | 3/2002 |
| KR | 10-0479282 B1 | 8/2005 |
| KR | 10-2008-0023888 A | 3/2008 |
| KR | 10-2013-0005776 A | 1/2013 |
| KR | 10-2014-0111403 A | 9/2014 |
| KR | 10-2015-0026911 A | 3/2015 |
| KR | 10-2015-0033969 A | 4/2015 |
| KR | 10-2015-0051458 A | 5/2015 |
| KR | 10-1550833 B1 | 9/2015 |
| KR | 10-2015-0121101 A | 10/2015 |
| KR | 10-2015-0125971 A | 11/2015 |
| KR | 10-2016-0118746 A | 10/2016 |
| KR | 10-1674060 B1 | 11/2016 |
| KR | 10-2016-0144008 A | 12/2016 |
| KR | 10-2017-0000208 A | 1/2017 |
| KR | 10-2017-0106263 A | 9/2017 |
| KR | 10-2017-0107124 A | 9/2017 |
| KR | 10-2017-0113822 A | 10/2017 |
| KR | 10-2017-0121674 A | 11/2017 |
| KR | 10-2018-0028597 A | 3/2018 |
| KR | 10-2018-0049484 A | 5/2018 |
| KR | 10-2018-0049780 A | 5/2018 |
| KR | 10-2019-0001864 A | 1/2019 |
| KR | 10-2019-0081264 A | 7/2019 |
| TW | 200704268 A | 1/2007 |
| TW | 201017499 A | 5/2010 |
| TW | 201438895 A | 10/2014 |
| TW | 201546006 A | 12/2015 |
| TW | 201617808 A | 5/2016 |
| TW | 201636309 A | 10/2016 |
| TW | 201637857 A | 11/2016 |
| VN | 58334 | 7/2018 |
| WO | 94/25272 A1 | 11/1994 |
| WO | 97/39074 A1 | 10/1997 |
| WO | 98/01649 A1 | 1/1998 |
| WO | 00/73062 A1 | 12/2000 |
| WO | 2004/087590 A2 | 10/2004 |
| WO | 2006/095005 A1 | 9/2006 |
| WO | 2007/108861 A1 | 9/2007 |
| WO | 2008/042731 A1 | 4/2008 |
| WO | 2008/153484 A1 | 12/2008 |
| WO | 2009/072530 A1 | 6/2009 |
| WO | 2011/029852 A1 | 3/2011 |
| WO | 2011/144359 A1 | 11/2011 |
| WO | 2011/155403 A1 | 12/2011 |
| WO | 2012/005307 A1 | 1/2012 |
| WO | 2012/058084 A2 | 5/2012 |
| WO | 2012/166343 A2 | 12/2012 |
| WO | 2013/072611 A1 | 5/2013 |
| WO | 2013/072612 A1 | 5/2013 |
| WO | 2013/174715 A1 | 11/2013 |
| WO | 2013/175106 A2 | 11/2013 |
| WO | 2014/085663 A1 | 6/2014 |
| WO | 2014/107640 A1 | 7/2014 |
| WO | 2014/172237 A2 | 10/2014 |
| WO | 2014/175371 A1 | 10/2014 |
| WO | 2015/031594 A2 | 3/2015 |
| WO | 2015/055583 A1 | 4/2015 |
| WO | 2015/057552 A2 | 4/2015 |
| WO | 2015/084902 A1 | 6/2015 |
| WO | 2015/085283 A1 | 6/2015 |
| WO | 2015/141966 A1 | 9/2015 |
| WO | 2016/007815 A1 | 1/2016 |
| WO | 2016/007843 A1 | 1/2016 |
| WO | 2016/010947 A1 | 1/2016 |
| WO | 2016/010949 A1 | 1/2016 |
| WO | 2016/027812 A1 | 2/2016 |
| WO | 2016/044360 A1 | 3/2016 |
| WO | 2016/069113 A1 | 5/2016 |
| WO | 2016/070974 A1 | 5/2016 |
| WO | 2016/115311 A1 | 7/2016 |
| WO | 2016/125713 A1 | 8/2016 |
| WO | 2016/136758 A1 | 9/2016 |
| WO | 2016/173699 A1 | 11/2016 |
| WO | 2016/183059 A1 | 11/2016 |
| WO | 2016/195301 A1 | 12/2016 |
| WO | 2016/196531 A1 | 12/2016 |
| WO | 2016/196546 A1 | 12/2016 |
| WO | 2016/202605 A1 | 12/2016 |
| WO | 2016/208967 A2 | 12/2016 |
| WO | 2017/015392 A1 | 1/2017 |
| WO | 2017/019851 A1 | 2/2017 |
| WO | 2017/023673 A1 | 2/2017 |
| WO | 2017/106081 A1 | 6/2017 |
| WO | 2017/146866 A1 | 8/2017 |
| WO | 2017/155932 A1 | 9/2017 |
| WO | 2017/158031 A1 | 9/2017 |
| WO | 2018/005646 A1 | 1/2018 |
| WO | 2018/009504 A1 | 1/2018 |
| WO | 2018/015392 A1 | 1/2018 |
| WO | 2018/075853 A1 | 4/2018 |
| WO | 2018/081068 A1 | 5/2018 |
| WO | 2018/102332 A1 | 6/2018 |
| WO | 2018/125683 A1 | 7/2018 |
| WO | 2018/160812 A2 | 9/2018 |
| WO | 2018/200454 A1 | 11/2018 |
| WO | 2018/200807 A1 | 11/2018 |
| WO | 2018/213267 A1 | 11/2018 |
| WO | 2019/055469 A1 | 3/2019 |
| WO | 2019/055652 A1 | 3/2019 |
| WO | 2019/074800 A1 | 4/2019 |
| WO | 2019/075065 A1 | 4/2019 |
| WO | 2019/151618 A1 | 8/2019 |

OTHER PUBLICATIONS

"Product Information Sheet", Corning® Gorilla® Glass 3 with Native Damage Resistance™, Corning Incorporated, Rev: F_090315, 2015, 2 pages.
"Stainless Steel—Grade 410 (UNS S41000)", available online at <https://www.azom.com/article.aspx?ArticleID=970>, Oct. 23, 2001, 5 pages.
"Standard Test Method for Measurement of Glass Stress—Optical Coefficient", ASTM International, Designation: C770-16, 2016.
"Stiles Custom Metal, Inc"., Installation Recommendations, Retrieved from: https://stilesdoors.com/techdata/pdf/Installation% 20Recommendations%20HM%20Windows,%20Transoms%20&% >OSidelites%200710.pdf), 2010, 3 Pages.
Ashley Klamer, "Dead front overlays", Marking Systems, Inc., Jul. 8, 2013, 2 pages.
ASTM C1279-13 "Standard Test Method for Non-Destructive Photoelastic Measurement of Edge and Surface Stresses in Annealed, Heat-Strengthened, and Fully Tempered Flat Glass"; Downloaded Jan. 24, 2018; 11 Pages.
ASTM C1422/C1422M-10 "Standard Specification for Chemically Strengthened Flat Glass"; Downloaded Jan. 24, 2018; 5 pages.
ASTM Standard C770-98 (2013), "Standard Test Method for Measurement of Glass Stress-Optical Coefficient", 2013, 8 pages.
Author Unknown; "Stress Optics Laboratory Practice Guide" 2012; 11 Pages.

(56) References Cited

OTHER PUBLICATIONS

Baillon et al: "An Improved Method for Manufacturing Accurate and Cheap Glass Parabolic Mirrors", Nuclear Instruments & Methods in Physics Research. Section A, Elsevier BV * North-Holland, NL, vol. A276, No. 3, 1988, 13 pages, XP000051982.

Belis et al; "Cold Bending of Laminated Glass Panels"; Heron vol. 52 (2007) No. 1/2; 24 Pages.

Burchardt et al., (Editorial Team), Elastic Bonding: The basic principles of adhesive technology and a guide to its cost-effective use in industry, 2006, 71 pages.

Byun et al; "A Novel Route for Thinning of LCD Glass Substrates"; SID 06 Digest; pp. 1786-1788, v37, 2006.

Chinese Patent Application No. 201780072054.0, Office Action dated Jun. 28, 2021, 11 pages (7 pages of English Translation and 4 pages of Original Document), Chinese Patent Office.

Datsiou et al., "Behaviour of cold bent glass plates during the shaping process", Engineered Transparency. International Conference atglasstec, Dusseldorf, Germany, Oct. 21 and 22, 2014, 9 pages.

Doyle et al; "Manual on Experimental Stress Analysis"; Fifth Edition, Society for Experimental Mechanics, 1989, 31 Pages.

Elziere; "Laminated Glass: Dynamic Rupture of Adhesion"; Polymers; Universite Pierre et Marie Curie—Paris VI, 2016. English; 181 Pages.

Engineering ToolBox, "Coefficients of Linear Thermal Expansion", available online at <https://www.engineeringtoolbox.com/linear-expansion-coefficients-d_95.html>, 2003, 9 pages.

European Patent Application No. 17794590 Office Action dated Jul. 23, 2020; 4 Pages; European Patent Office.

European Patent Application No. 18704324.5 Office Action dated May 25, 2020; 3 Pages; European Patent Office.

European Patent Application No. 18753478.9 Office Action dated Jul. 23, 2020; 3 Pages; European Patent Office.

Extended European Search Report and Search Opinion; 20156137; Mailed Jun. 12, 2020; 7 pages; European Patent Office.

Fauercia "Intuitive HMI for a Smart Life on Board" (2018); 8 Pages http://www.faurecia.com/en/innovation/smart-life-board/intuitive-HMI.

Faurecia: Smart Pebbles, Nov. 10, 2016 (Nov. 10, 2016), XP055422209, Retrieved from the Internet: URL:https://web.archive.org/web/20171123002248/http://www.faurecia.com/en/innovation/discover-our-innovations/smart-pebbles[retrieved on Nov. 23, 2017], 4 Pages.

Ferwerda et al., "Perception of sparkle in anti-glare display screens", Journal of the SID, vol. 22, Issue 2, 2014, pp. 129-136.

Fildhuth et al; "Considerations Using Curved, Heat or Cold Bent Glass for Assembling Full Glass Shells", Engineered Transparency, International Conference at Glasstec, Dusseldorf, Germany, Oct. 25 and 26, 2012; 11 Pages.

Fildhuth et al; "Interior Stress Monitoring of Laminated Cold Bent Glass With Fibre Bragg Sensors", Challenging Glass 4 & Cost Action TU0905 Final Conference Louter, Bos & Belis (Eds), 2014; 8 Pages.

Fildhuth et al; "Layout Strategies and Optimisation of Joint Patterns in Full Glass Shells", Challenging Glass 3—Conference on Architectural and Structural Applications of Glass, Bos, Louter, Nijsse, Veer (Eds.), Tu Delft, Jun. 2012; 13 Pages.

Fildhuth et al; "Recovery Behaviour of Laminated Cold Bent Glass—Numerical Analysis and Testing" ; Challenging Glass 4 & Cost Action TU0905 Final Conference—Louter, Bos & Beus (Eds) (2014); 9 Pages.

Fildhuth; "Design and Monitoring of Cold Bent Lamination—Stabilised Glass"; ITKE 39 (2015) 270 Pages.

Galuppi et al; "Buckling Phenomena in Double Curved Cold-Bent Glass;" Intl. Journal of Non-Linear Mechanics, vol. 64, 2014, pp. 70-84.

Galuppi et al; "Cold-Lamination-Bending of Glass: Sinusoidal Is Better Than Circular", Composites Part B, 79, 2015, pp. 285-300.

Galuppi et al; "Large Deformations and Snap-Through Instability of Cold-Bent Glass"; Challenging Glass 4 & Cost Action TU0905 Final Conference, 2014, pp. 681-689.

Galuppi et al; "Optical Cold Bending of Laminated Glass"; International Journal of Solids and Structures, vol. 67-68, 2015, pp. 231-243.

Galuppi L et al: "Optimal cold bending of laminated glass", Jan. 1, 2007 vol. 52, No. 1/2 Jan. 1, 2007 (Jan. 1, 2007), pp. 123-146.

Gollier et al., "Display Sparkle Measurement and Human Response", SID Symposium Digest of Technical Papers, vol. 44, Issue 1, 2013, pp. 295-297.

Indian Patent Application No. 201917031293 Office Action dated May 24, 2021; 6 pages; Indian Patent Office.

International Preliminary Report on Patentability of the International Searching Authority; PCT/US2018/012215; Mailed Jul. 18, 2019; 15 Pages; European Patent Office.

International Search Report and Writien Opinion of the International Searching Authority; PCT/US2018/012215 Dated Aug. 1, 2018; 19 Pgs; European Patent Office.

International Search Report and Written Opinion of the International Searching Authority; PCT/US2017/058010; Mailed Dec. 20, 2017; 10 Pages; European Patent Office.

International Search Report and Written Opinion of the International Searching Authority; PCT/US2018/041062 Dated Nov. 13, 2018; 15 Pgs; European Patent Office.

Invitation to Pay Additional Fees of the International Searching Authority; PCT/US2018/012215; Mailed May 11, 2018; 10 Pages; European Patent Office.

Jalopnik, "This Touch Screen Car Interior is a Realistic Vision of the Near Future", jalopnik.com, Nov. 19, 2014, https://jalopnik.com/this-touch-screen-car-interior-is-a-realistic-vision-of-1660846024 (Year: 2014).

Japanese Patent Application No. 2019-552104, Office Action, dated Jul. 27, 2022, 14 pages (7 pages of English Translation and 7 pages of Original Copy); Japanese Patent Office.

Japanese Patent Application No. 2019518105; English Translation of the Office Action Mailed Jan. 8, 2020; Japan Patent Office; 7 Pgs.

Korean Patent Application No. 10-2019-7014915, Notice of Allowance, dated Jan. 24, 2022, 7 pages (4 pages of English Translation and 3 pages of Original Document), Korean Patent Office.

Korean Patent Application No. 10-2020-7003714 Notice of Final Rejection dated Nov. 27, 2020; 7 Pages; (4 pages of English Translation and 3 pages of Original Document). Korean Patent Office.

Korean Patent Application No. 10-2021-7008331, Office Action dated Mar. 29, 2021, 13 pages (7 page of English Translation and 6 pages of Original Document); Korean Patent Office.

Li et al., "Effective Surface Treatment on the Cover Glass for Autointerior Applications", SID Symposium Digest of Technical Papers, vol. 47, 2016, pp. 467-469.

Millard; "Bending Glass in the Parametric Age", Retrieved from: http://www.enclos.com/site-info/news/bending-glass-in-the-parametric-age, ENCLOS, 2015, pp. 1-6.

Neugebauer et al; "Let Thin Glass in the Faade Move Thin Glass-New Possibilities for Glass in the Faade", Conference Paper, Jun. 2018, 12 Pages.

Pambianchi et al; "Corning Incorporated: Designing a New Future With Glass and Optics"; Chapter 1 in "Materials Research for Manufacturing: An Industrial Perspective of Turning Materials Into New Products"; Springer Series Material Science, Issue 224, 2016, pp. 12.

Pegatron Corp. "Pegaton Navigate the Future"; Ecockpit/Center Console Work Premiere; Automotive Worlds, Downloaded on Jul. 12, 2017, 2 Pages.

Photodon, "Screen Protectors for Your Car's Navi System That You're Gonna Love", photodon.com, Nov. 6, 2015, https://www.photodon.com/blog/archives/screen-protectors-for-your-cars-navi-system-that-youre-gonna-love) (Year: 2015).

Scholze, H., "Glass-Water Interactions", Journal of Non-Crystalline Solids vol. 102, Issues 1-3, Jun. 1, 1988, pp. 1-10.

Stattler, "New Wave—Curved Glass Shapes Design", Glass Magazine, 2013; 2 Pages.

Taiwanese Patent Application No. 107100170, Office Action dated Jul. 9, 2021, 3 pages (English Translation Only); Taiwanese Patent Office.

(56)    References Cited

OTHER PUBLICATIONS

Taiwanese Patent Application No. 107123694, Office Action dated Jul. 5, 2021, 2 pages (English Translation Only); Taiwanese Patent Office.

Taiwanese Patent Application No. 110146529, Office Action, dated Jun. 22, 2022, 1 page; Taiwanese Patent Office.

Taiwanese Patent Application No. 106136742, Office Action dated Feb. 20, 2021, 2 pages (English Translation Only); Taiwanese Patent Office.

Tomozawa et al., "Hydrogen-to-Alkali Ratio in Hydrated Alkali Aluminosilicate Glass Surfaces", Journal of Non-Crystalline Solids, vol. 358, Issue 24, Dec. 15, 2012, pp. 3546-3550.

Translation of JP 2015092422 (abstract and description). (Year: 2015).

Translation of JP2015092422 (including bib and description). (Year: 2015).

Vakar et al; "Cold Bendable, Laminated Glass—New Possibilities in Design"; Structural Engineering International, vol. 2, 2004, pp. 95-97.

Wang, "Polydimethylsiloxane mechanical properties measured by macroscopic compression and nanoindentation techniques", Graduate Theses and Dissertations, University of South Florida, 2011, 79 pages.

Weijde; "Graduation Plan", Jan. 2017; 30 Pages.

Werner; "Display Materials and Processes," Information Display; May 2015; 8 Pages.

Zhixin Wang, Polydimethylsiloxane mechanical properties measured by macroscopic compression and nanoindentation techniques, Graduate Theses and Dissertations, University of South Florida, 2011, 79 pages.

* cited by examiner

100

132

120

110

1

1'

130

150

130

132

110

120

200

132

120

140

110

130

2

2'

250

130

132

110

120

140

300

132
120
310
140
110
130

3

3'

350

130
132
110
310
120
140
320

500

320

130

132

110

310

120

140

1000

1050

Cold forming the substrate and fixing to a rigid support structure

1810

Attaching a display to the cold-formed glass substrate or to the support structure

1820

1800

COLD-FORM GLASS LAMINATION TO A DISPLAY

CROSS-REFERENCE TO RELATED APPLICATIONS

This application is a continuation application and claims the benefit of priority under 35 U.S.C. § 120 of U.S. application Ser. No. 16/344,637 and filed on Apr. 29, 2019, which in turn, is a national stage application under 35 U.S.C. § 371 of International Patent Application Serial No. PCT/US2017/058010, filed on Oct. 24, 2017, which in turn claims the benefit of priority under 35 U.S.C. § 119 of U.S. Provisional Application Ser. No. 62/412,542, filed on Oct. 25, 2016, the contents of which are relied upon and incorporated herein by reference in their entireties.

BACKGROUND

The present disclosure relates to curved cold-formed glass substrates, articles including such glass substrates, and related processes.

Curved glass substrates are desirable in many contexts. One such context is for use as a cover glass for a curved display, which may be incorporated into an appliance, an architectural element (e.g., wall, window, modular furniture, shower door, mirrors etc.), a vehicle (e.g., automobiles, aircraft, sea craft and the like). Existing methods of forming such curved glass substrates, such as thermal forming, have drawbacks including optical distortion and surface marking.

BRIEF SUMMARY

In some embodiments, articles comprising a display attached to cold-formed glass substrate are described, and methods of making such articles.

In some embodiments, a process comprises fixing a first portion of a flexible glass substrate into a first fixed shape with a first rigid support structure and attaching a first display to the first portion of the flexible glass substrate or to the first rigid support structure. After fixing the first portion and attaching the first display, and while maintaining the first fixed shape of the first portion of the flexible glass substrate and the attached first display, cold-forming a second portion of the flexible glass substrate to a second fixed shape and fixing the second portion of the flexible glass substrate into the second fixed shape with a second rigid support structure.

In some embodiments, the embodiments of any of the preceding paragraphs may further include a planar first display, a planar first fixed shape, and the first portion of the flexible glass substrate fixed into the first fixed shape with the first rigid support structure after attaching the first display to the first portion of the flexible glass substrate.

In some embodiments, the embodiments of any of the preceding paragraphs may further include first portion of the flexible glass substrate fixed into the first fixed shape with the first rigid support structure before attaching the first display to the first portion of the flexible glass substrate.

In some embodiments, the embodiments of any of the preceding paragraphs may further include the first fixed shape being planar or non-planar.

In some embodiments, the embodiments of any of the preceding paragraphs may further include the first display having a planar or a non-planar shape.

In some embodiments, the embodiments of any of the preceding paragraphs may further include the first fixed shape being formed by cold-forming the first portion of the flexible glass substrate.

In some embodiments, the embodiments of any of the preceding paragraphs may further include a first display having a shape same as the first fixed shape.

In some embodiments, the embodiments of any of the preceding paragraphs may further include the first rigid support structure permanently attached to the first portion of the flexible glass substrate.

In some embodiments, the embodiments of any of the preceding paragraphs may further include the second fixed shape being non-planar.

In some embodiments, the embodiments of any of the preceding paragraphs may further include the second rigid support structure permanently attached to the second portion of the flexible glass substrate.

In some embodiments, the embodiments of any of the preceding paragraphs may further include the first display attached to the flexible glass substrate or to the first rigid support structure using a method selected from optical bonding or air gap bonding.

In some embodiments, the embodiments of any of the preceding paragraphs may further include a process comprising fixing a third portion of the flexible glass substrate into a third fixed shape with a third rigid support structure and attaching a second display to the third portion of the flexible glass substrate or to the third rigid support structure. The process further comprising cold-forming the second portion of the flexible glass substrate to the second fixed shape and fixing the second portion of the flexible glass substrate into the second fixed shape with the second rigid support structure, which is performed after fixing the third portion and attaching the second display, and while maintaining the third fixed shape of the third portion of the flexible glass substrate and the attached second display.

In some embodiments, the embodiments of any of the preceding paragraphs may further include the flexible glass substrate comprising a chemically strengthened glass.

In some embodiments, the embodiments of any of the preceding paragraphs may further include the process further comprising applying a coating to the flexible glass substrate before fixing the first portion and attaching the first display, and while the flexible glass substrate is planar.

In some embodiments, the embodiments of any of the preceding paragraphs may further include one of the at least one coatings is a decorative ink coating.

In some embodiments, the embodiments of any of the preceding paragraphs may further include one of the at least one coatings is an antireflective coating.

In some embodiments, the embodiments of any of the preceding paragraphs may further include the flexible glass substrate directly bonded to the first rigid support structure.

In some embodiments, the embodiments of any of the preceding paragraphs may further include the process further comprising applying an adhesive to at least one of the first rigid support structure and the flexible glass substrate prior to bonding.

In some embodiments, the embodiments of any of the preceding paragraphs may further include the flexible glass substrate bonded to the first rigid support structure using a method selected from roller tapes, mechanical retainers, press molding, or die molding.

In some embodiments, the embodiments of any of the preceding paragraphs may further include an article formed by the process comprising fixing a first portion of a flexible glass substrate into a first fixed shape with a first rigid support structure and attaching a first display to the first portion of the flexible glass substrate or to the first rigid support structure. After fixing the first portion and attaching the first display, and while maintaining the first fixed shape of the first portion of the flexible glass substrate and the attached first display, cold-forming a second portion of the flexible glass substrate to a second fixed shape and fixing the second portion of the flexible glass substrate into the second fixed shape with a second rigid support structure.

In some embodiments, the embodiments of any of the preceding paragraphs may further include an article comprising a cold-formed flexible glass substrate fixed into a non-planar fixed shape with a rigid support structure, and a display attached to the cold-formed flexible glass substrate.

In some embodiments, the embodiments of any of the preceding paragraphs may further include an article where there is no residual stress between the display and the cold-formed flexible glass substrate.

In some embodiments, the embodiments of any of the preceding paragraphs may further include a process comprising cold-forming a flexible glass substrate into a non-planar fixed shape, attaching the flexible glass substrate to a rigid support structure, and after cold forming and attaching the flexible glass substrate to a rigid support structure, attaching a display to the flexible glass substrate or to the rigid support structure.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1A:
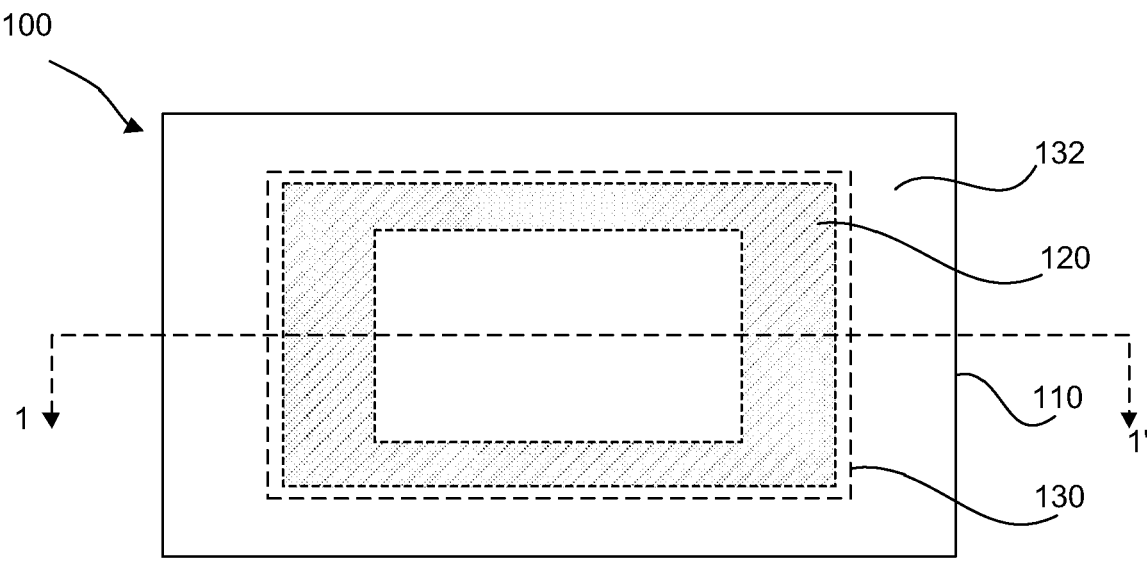
FIG. 1A illustrates a top view of a glass substrate with a support structure.

Vehicle manufacturers are creating interiors that better connect, protect and safely inform today's drivers and passengers. As the industry moves towards autonomous driving, there is a need for creating large format appealing displays. There is already a trend towards larger displays including touch functionality in the new models from several OEMs. Such trends are also emerging in appliances, architectural elements (e.g., wall, window, modular furniture, shower door, mirrors etc.), and other vehicles (e.g., aircraft, sea-craft and the like). However, most of these displays consist of two dimensional plastic cover lenses.

Due to these emerging trends in the automotive interior industry and related industries, there is a need to develop a low cost technology to make three-dimensional transparent surfaces. Strengthened glass materials, such as chemically strengthened, thermally strengthened and/or mechanically strengthened glass materials are particularly desirable for use as such surfaces, particularly where the glass substrate is used as a curved cover glass for a display.

However, many methods for forming curved glass surfaces involve subjecting glass substrates to thermal forming processes (that include heating a glass substrate to a temperature above the transition temperature of the glass). Such processes can be energy intensive due to the high temperatures involved and such processes add significant cost to the product. Furthermore, thermal forming processes may cause strength degradation or may damage any coatings present on the glass substrate, such as antireflective (AR) coatings or ink coatings. Moreover, thermal forming processes may impart undesirable characteristics onto the glass itself, such as distortion and marking.

A planar glass substrate may be "cold-formed" to have a curved or three-dimensional shape. As used herein, "cold-forming" refers to bending the glass substrate at temperatures below the glass transition temperature of the glass. In some embodiments, cold-forming occurs at temperatures below 80° F. A cold-formed glass substrate has opposing major surfaces and a curved shape. The opposing major surfaces exhibit surface stresses that differ from one another that are created during cold-forming. The stresses include surface compressive stresses or tensile stresses generated by the cold-forming process. These stresses are not thermally relaxed because the glass substrate is maintained at temperatures well below the glass transition temperature.

In some embodiments, a cold-formed glass substrate forms a "developable" surface. A developable surface is a surface with zero Gaussian curvature—i.e., a surface that can be flattened into a plane without stretching or compressing within the plane of the surface. Examples of developable surfaces include cones, cylinders, oloids, tangent developable surfaces, and portions thereof. A surface that projects onto a single curved line is a developable surface. On the other hand, most smooth surfaces have a non-zero Gaussian curvature and are non-developable surfaces—a sphere is an example of a non-developable shape or surface since it cannot be rolled into a plane.

At any point on a surface, there can be found a normal vector that is at right angles to the surface; planes containing the normal vector are called normal planes. The intersection of a normal plane and the surface will form a curve called a normal section and the curvature of this curve is the normal curvature. The normal curvature varies depending upon which normal plane is considered. One such plane will have a maximum value for such curvature, and another will have a minimum value. These maximum and minimum values are called the principal curvatures.

Geometrically, Gaussian curvature is defined as the intrinsic measure of curvature of any surface, depending only on the distances that are measured on the surface, not on the way it is isometrically embedded in any space. Gaussian curvature can also be defined as the product of principal curvatures, $K_{max}$ and $K_{min}$. Since the Gaussian curvature of a developable surface is zero everywhere, the maximum and minimum principal curvatures of a developable surface can be written as Equation (1):

$$K_{max}=H+|H|, \ K_{min}=H-|H| \qquad (1)$$

$$K_{max}=2H, \kappa\_min=0 \text{ when } H>0, \qquad (2)$$

$$K\_max=0, \kappa\_min=0 \text{ when } H=0, \qquad (3)$$

$$K\_max=0, \kappa\_min=2H \text{ when } H<0, \qquad (4)$$

where H is the mean curvature of the surface.
$K_{max}$ in equation (2) and $K_{min}$ in equation (4) are termed as the non-zero principal curvature of a surface.

In some embodiments, a cold-formed glass substrate has a complex developable shape. A complex developable shape refers to a combination of two or more developable shapes such as cones, cylinders, oloids, planes and tangent developable surfaces. For instance, a complex developable shape may be a combination of at least a planar and at least a concave surface, or at least a planar and at least a convex surface, or at least a concave and at least a convex surface.

In some embodiments, a complex developable shape may also be formed by a combination of planar, conical, cylindrical, and other developable surfaces and involve both inward and outward bending. In some embodiments, the combination of planar, conical, cylindrical, and other developable surfaces may be in such a way that no sharp angles form while going from one developable surface to another.

In some embodiments, a complex developable shape or a complex developable surface may include one or more planar portions, one or more conical portions, one or more cylindrical portions, and/or one or more other developable surface portions.

In some embodiments, the article may include a glass substrate that is provided as a sheet and that is strengthened (prior to being shaped into some embodiments of the article described herein). For example, the glass substrate may be strengthened by any one or more of thermal strengthening, chemical strengthening, and mechanical strengthening or by a combination thereof. In some embodiments, strengthened glass substrates have a compressive stress (CS) layer extending from a surface of the substrate thereof to a compressive stress depth (or depth of compressive stress layer or DOL). The depth of compression is the depth at which compressive stress switches to tensile stress. The region within the glass substrate exhibiting a tensile stress is often referred to as a central tension or CT layer.

As used herein, "thermally strengthened" refers to glass substrates that are heat treated to improve the strength of the substrate. In thermally-strengthened glass substrates, the CS layer is formed by heating the substrate to an elevated temperature above the glass transition temperature (i.e., near or approaching the glass softening point), and then cooling the glass surface regions more rapidly than the inner regions of the glass. The differential cooling rates between the surface regions and the inner regions generates a residual CS layer at the surfaces.

Factors that impact the degree of surface compression generated by thermal strengthening processes include the air-quench temperature, volume, and other variables that create a surface compression of at least 10,000 pounds per square inch (psi). In chemically strengthened glass substrates, the replacement of smaller ions by larger ions at a temperature below that at which the glass network can relax produces a distribution of ions across the surface of the glass that results in a stress profile. The larger size volume of the incoming ion produces the CS layer extending from a surface and the CT layer in the center of the glass. Chemical strengthening may be achieved by an ion exchange process, which includes immersion of a glass substrate into a molten salt bath for a predetermined period of time to allow ions at or near the surface(s) of the glass substrate to be exchanged for larger metal ions from the salt bath. In some embodiments, the temperature of the molten salt bath is from about 375° C. to about 450° C. and the predetermined time period is in the range from about four to about eight hours. In one example, sodium ions in a glass substrate are replaced by potassium ions from the molten bath, such as a potassium nitrate salt bath, though other alkali metal ions having larger atomic radii, such as rubidium or cesium, can replace smaller alkali metal ions in the glass. In another example, lithium ions in a glass substrate are replaced by potassium and/or sodium ions from the molten bath that may include potassium nitrate, sodium nitrate or a combination thereof, although other alkali metal ions having larger atomic radii, such as rubidium or cesium, can replace smaller alkali metal ions in the glass. In some embodiments, smaller alkali metal ions in the glass substrate can be replaced by Ag+ ions. Similarly, other alkali metal salts such as, but not limited to, sulfates, phosphates, halides, and the like may be used in the ion exchange process. The glass substrate may be immersed in a single bath or in multiple and successive baths which may have the same or different composition and/or temperature from one another. In some embodiments, the immersion in such multiple baths may be for different periods of time from one another.

In mechanically-strengthened glass substrates, the CS layer is generated by a mismatch of the coefficient of thermal expansion between portions of the glass substrate.

In strengthened glass substrates, the DOL is related to the CT value by the following approximate relationship: (Equation 5)

$$CT \cong \frac{CS \times DOL}{\text{thickness} - 2 \times DOL} \quad (5)$$

where thickness is the total thickness of the strengthened glass substrate and DOL depth of layer (DOL) is the depth of the compressive stress. Unless otherwise specified, central tension CT and compressive stress CS are expressed herein in MegaPascals (MPa), whereas thickness and depth of layer DOL are expressed in millimeters or microns.

Unless otherwise described, the CS value is the value measured at the surface and the CT value is the tensile stress value (as determined by Equation 5).

In some embodiments, a strengthened glass substrate can have a surface CS of 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. In some embodiments, the surface CS is the maximum CS in the glass substrate. The strengthened glass substrate may have a DOL of 15 micrometers or greater, 20 micrometers or greater (e.g., 25, 30, 35, 40, 45, 50 micrometers or greater) and/or a maximum CT value of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened glass substrate has one or more of the following: a surface CS greater than 500 MPa, a DOL greater than 15 micrometers, and a maximum CT of greater than 18 MPa.

The CS and DOL may be determined by a surface stress meter such the commercially available FSM-6000 instrument, manufactured by Orihara Industrial, Co., Ltd. (Tokyo, Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method.

The materials for the glass substrates may be varied. The glass substrates used to form the articles described herein can be amorphous or crystalline. In this regard, the use of the term "glass" is general and is intended to encompass more than strictly amorphous materials. Amorphous glass substrates according to some embodiments can be selected from soda lime glass, alkali aluminosilicate glass, alkali containing borosilicate glass and alkali aluminoborosilicate glass. Examples of crystalline glass substrates can include glass-ceramics, sapphire or spinel. Examples of glass-ceramics include $Li_2O$—$Al_2O_3$—$SiO_2$ system (i.e. LAS-System) glass ceramics, $MgO$—$Al_2O_3$—$SiO_2$ System (i.e. MAS-System) glass ceramics, glass ceramics including crystalline phases of any one or more of mullite, spinel, α-quartz, β-quartz solid solution, petalite, lithium disilicate, β-spodumene, nepheline, and alumina.

Glass substrates may be provided using a variety of different processes. For example, exemplary glass substrate forming methods include float glass processes and down-draw processes such as fusion draw and slot draw. A glass substrate prepared by a float glass process may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass substrate that can be lifted from the tin onto rollers. Once off the bath, the glass substrate can be cooled further and annealed to reduce internal stress.

Down-draw processes produce glass substrates having a uniform thickness that possess relatively pristine surfaces, especially those produced by the fusion draw process. Because the average flexural strength of the glass substrate is controlled by the amount and size of surface flaws, a pristine surface that has had minimal contact has a higher initial strength. Down-drawn glass substrates may be drawn into a sheet having a thickness of less than about 2 millimeters. In addition, down drawn glass substrates have a very flat, smooth surface that can be used in its final application without costly grinding and polishing.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing sheet of glass. The fusion draw method offers the advantage that, because the two glass films flowing over the channel fuse together, neither of the outside surfaces of the resulting single sheet of glass comes in contact with any part of the apparatus. Thus, the surface properties of the fusion drawn sheet of glass are not affected by such contact.

The slot draw process is distinct from the fusion draw method. In slow draw processes, the molten raw material glass is provided to a drawing tank. The bottom of the drawing tank has an open slot with a nozzle that extends the length of the slot. The molten glass flows through the slot/nozzle and is drawn downward as a continuous sheet and into an annealing region.

Exemplary compositions for use in the glass substrate will now be described. One example glass composition comprises $SiO_2$, $B_2O_3$ and $Na_2O$, where $(SiO_2+B_2O_3)\geq66$ mol. %, and $Na_2O\geq9$ mol. %. Suitable glass compositions, in some embodiments, further comprise at least one of $K_2O$, MgO, and CaO. In some embodiments, the glass compositions can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. %$\leq(Li_2O+Na_2O+K_2O)$ $\leq20$ mol. % and 0 mol. %$\leq(MgO+CaO)\leq10$ mol. %.

A still further example glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. %$\leq(Li_2O+Na_2O+K_2O)\leq18$ mol. % and 2 mol. %$\leq(MgO+CaO)\leq7$ mol. %.

In some embodiments, an alkali aluminosilicate glass composition comprises alumina, at least one alkali metal and, in some embodiments, greater than 50 mol. % $SiO_2$, in some embodiments at least 58 mol. % $SiO_2$, and in some embodiments at least 60 mol. % $SiO_2$, wherein the ratio $((Al_2O_3+B_2O_3)/\Sigma$ modifiers$)>_1$, where in the ratio the components are expressed in mol. % and the modifiers are alkali metal oxides. This glass composition, in some embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $((Al_2O_3+B_2O_3)/\Sigma$modifiers$)>1$.

In some embodiments, the glass substrate may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $SiO_2+B_2O_3+CaO$ 69 mol. %; $Na_2O+K_2O+B_2O_3+MgO+CaO+SrO>10$ mol. %; 5 mol. %$\leq MgO+CaO+SrO\leq8$ mol. %; $(Na_2O+B_2O_3)$—$Al_2O_3$ 2 mol. %; 2 mol. %$\leq Na_2O$—$Al_2O_3$ 6 mol. %; and 4 mol. %$\leq(Na_2O+K_2O)$—$Al_2O_3\leq10$ mol. %.

In some embodiments, the glass substrate may comprise an alkali aluminosilicate glass composition comprising: 2 mol % or more of $Al_2O_3$ and/or $ZrO_2$, or 4 mol % or more of $Al_2O_3$ and/or $ZrO_2$.

In some embodiments, the compositions used for a glass substrate may be batched with 0-2 mol. % of at least one fining agent selected from a group that includes $Na_2SO_4$, NaCl, NaF, NaBr, $K_2SO_4$, KCl, KF, KBr, and $SnO_2$.

The articles may be a single sheet of glass or a laminate. According to some embodiments, a laminate refers to opposing glass substrates, such as the glass substrates described herein. In some embodiments, the glass substrates may be separated by an interlayer, for example, poly(vinyl butyral) (PVB), ethylenevinylacetate (EVA), polyvinyl chloride (PVC), ionomers, and thermoplastic polyurethane (TPU). A glass substrate forming part of a laminate can be strengthened (chemically, thermally, and/or mechanically) as described above. Thus, laminates according to some embodiments comprise at least two glass substrates bonded together by an interlayer in which a first glass substrate defines a first ply and a second glass substrate defines a second ply. The second ply may face the user of a display (i.e., the interior of a vehicle, the user-facing panel of an appliance or the user-facing surface of an architectural element), while the first ply may face the opposite direction. In vehicle applications such as automotive glazings, the first ply is exposed to a vehicle or automobile interior and the second ply faces an outside environment of the automobile. In some embodiments, the user interface may be from the interior, from the exterior or from both the interior and the exterior of the laminate, when used in automotive glazings. In vehicle applications such as automotive interiors, the second ply is unexposed and placed on an underlying support (e.g., a display, dashboard, center console, instrument panel, seat back, seat front, floor board, door panel, pillar, arm rest etc.), and the first ply is exposed to the vehicle or automobile interior and thus the user. In architectural applications, the second ply is exposed to a building, room, or furniture interior and the first ply faces an outside environment of the building, room or furniture.

Although various specific glasses are described herein, in some embodiments, any cold-formable glass may be used.

Some embodiments of the articles disclosed herein are useful in automobile interiors because such articles provide a non-planar cover compatible with curved displays. To be compatible with a non-planar display, a cover should match the shape of the non-planar display closely to insure optimal fit and enable a high quality viewing. It is also desirable to provide a cover that is high optical quality and cost effective. Thermal forming a cover to the precise shape presents challenges in attaining that desired shape. In addition, when glass is used, it is a challenge to minimize the downside effects of heating the cover to its softening point (e.g., distortion, and marking). The concept of cold-forming addresses these issues and permits the use of glass but creates new challenges in providing a sufficient support to maintain the cold-form shape and provide rigidity. The ability to cold-form a flexible glass substrate to the prescribed shape presents the opportunity for a high quality, cost effective solution.

Moreover, the articles described herein are also compatible with coatings and surface treatments that are often desirable. Examples of such coatings include anti-reflective (AR), antiglare (AG) and decorative and/or functional coatings. Examples of such surface treatments include AG surfaces, a haptic surface that provides tactile feedback, and the like. AR and AG coatings and AG surfaces may improve display visibility in a variety of challenging ambient lighting conditions. High-quality multi-layer AR coating processes are typically applied utilizing vapor deposition or sputter coating techniques. These techniques are usually limited to deposition on flat surfaces due to the nature of the process. Providing these coatings on a non-planar three dimensional surface is challenging and further adds to the cost of the process. Decorative ink coatings can be applied to a variety of shaped/curved surfaces, however the process to apply these coating to flat surfaces are simpler, better established, and more cost effective. Further, surface treatments (typically formed by etching treatments) are also typically applied to flat surfaces.

In some embodiments, various processes to attach a display to a piece of glass intended to be cold-formed to a specific shape, are described. The ability to provide a cold-formed curved glass article provides a significant advantage in eliminating the thermal forming/bending process. Elimination of the thermal forming process is both a cost and a quality improvement. The cost is obvious in that it eliminates a process step; the quality is improved due to not heating the glass to a softening point to shape it. Heating the glass to an elevated temperature can disrupt the pristine glass surface, both optically and dimensionally. Glass for auto interior is expected to have a high percentage of display application; the displays being very sensitive to glass distortion and flatness, favoring the cold-form process. One step to the successful implementation will be the process of attaching or laminating the display to the cover glass.

In some embodiments described herein, the use of a "die" is described. As used herein, a die includes a structure used to impart a desired shape to a glass substrate, and to attach a non-planar rigid support structure to the glass substrate. The die itself is not a part of the finished article, but rather may be used repeatedly to create many finished articles. In one or more embodiments, the term "die" refers to a tool used to impart a desired shape upon an object. In such embodiments, "die" has at least two parts, a first part and a second part, that may be pressed together to impart a desired shape on a flexible object disposed between the first and second parts. Once the non-planar rigid support structure is bonded to the cold-formed glass substrate, the die may be removed, and the non-planar rigid support structure maintains the desired shape of the cold-formed glass substrate. A die may be reused many times to reproducibly and precisely create the same shape for multiple articles comprising a non-planar rigid support structure bonded to a cold-formed glass substrate.

In some embodiments, an injection molding process is used to transform the flat glass substrate described herein to cold-formed and curved article created by injection molding a support structure on a major surface of the glass substrate, thus providing a superior support structure to hold the glass substrate to the prescribed shape and having the flexibility to match the curved display.

In some embodiments, injection molding is used to form a non-planar rigid support structure bonded to a surface of a cold-formed glass substrate. Any suitable injection molding process and material(s) may be used. For example, a die may be used to cold form a glass substrate and hold it in place while a non-planar rigid support structure is injection molded and attached to the cold formed glass substrate using channels in the die. For example, polyvinyl chloride (PVC) and thermoplastic polyurethane (TPU) are two common materials used to injection mold the non-planar rigid support structure. Reaction injection molding (RIM) may be used in some embodiments. Common materials used in RIM include polyurethane polyureas, polyisocyanurates, polyesters, polyphenols, polyepoxides, and nylon 6. Different materials may have different operating parameters. The machines, operating parameters (e.g., pressure, flow rate, temperature), and mold design may be different for different materials. Typical injection molding temperatures range from 300° F. to 450° F., and typical process pressures can range from the 200 psi to higher than 1000 psi. But, any suitable process parameters may be used.

In some embodiments, a direct bonding process is used to cold-form and bond a previously flat glass substrate to a non-planar rigid support structure. For example, a die may be used to press the glass substrate in a cold-formed shape while pressing the glass against the non-planar rigid support structure. Any suitable type of bonding, such as adhesive, may be used to attach the glass substrate to the non-planar rigid support structure.

Either injection molding or direct bonding could provide support over a significant portion of the major surface of the glass substrate to support and maintain the cold-formed shape, while minimizing the stresses imparted on the glass substrate.

In some embodiments, the methods described and the resulting articles exhibit high quality and enable the integration of optical and other features.

The articles described herein are expected to exhibit superior fit to curved displays and high optical quality. Flexible glass substrates may possess a flexible characteristic able to accommodate the curved display. Cold-forming maintains the high quality of the flat glass substrate that would otherwise be diminished in a thermal forming process. This concept also allows excellent stress management, minimizing the cold-form stress by providing support over a large area.

In some embodiments, the articles can easily integrate high quality coatings and surface treatments on a curved substrate surface, where such coatings are typically limited to flat parts. The coatings and/or surface treatments may be applied to a glass substrate prior to cold-forming, and cold-forming the coated and/or treated glass substrate in turn avoids the issues associated with thermal forming (i.e., damage to the coating and/or surface treatment from handling and/or high processing temperature).

In some embodiments, articles may have one or more coatings. The coatings may be any suitable coating including decorative ink coating, antireflective coating, or a combination thereof. In cases where more than one coatings are present, for example, the decorative ink coating and antireflective coating or any other coatings, may overlap, may be in different parts of the same side of the flexible glass substrate, or may be on different sides of the flexible glass substrate.

In some embodiments, a roller (preferably of soft materials, for example, of Teflon), a roller tape, pins, or a combination thereof is used to push the flexible glass substrate to conform to the shape of a rigid support structure, after a layer of adhesive is applied on the rigid support structure. Force may be applied to and maintained by multiple rollers and/or pins by any suitable means. For example, pressure chambers or a manifold that can apply and maintain a constant pressure on all rollers, or all pins pneumatically, hydraulically, mechanically or electronically through solenoid valves. A flexible mold may be similarly used.

In some embodiments, a roller, roller tape, array of pins, or flexible mold can be as wide as the flexible glass substrate. In another case it also can be as narrow as 10 mm. In the latter case, the flexible mold can also be applied along the both edges and/or along the center line. In most cases, a roller, roller tape or pins start from one side of the cover glass item, and moves toward the other end while aligned with the generation line of the developable surface. This method can avoid glass buckling and compound bending in the process of cold-forming, and hence can eliminate the risk of glass breakage caused by unwanted glass buckling and compound bending, and can enable cold bending to a smaller radius.

In some embodiments, as used herein, "generation line" refers to a line that defines a boundary between areas of a substrate where force has already been applied to press a flexible glass substrate against the adhesive layer, and areas of the substrate where such force has not yet been applied. The generation line is aligned with the zero principal curvature direction of the 3D shape. During a process of bonding the flexible glass substrate to the support structure, the generation line moves across the flexible glass substrate to sequentially press different parts of the flexible glass substrate against the support structure. Once the generation line has passed a particular part of the flexible glass substrate, the force is maintained until an adhesive holding the flexible glass substrate against the support structure is cured.

Force may be maintained in an area by application of force in spaced or periodic parts of the area. For example, once a roller tape passes over an area, or spaced pins have been actuated, spaced rollers or pins maintain the force. Gaps between the rollers do not negate maintenance of force, because the spaced rollers hold the flexible glass substrate against the support structure sufficiently well that the flexible glass substrate and the support structure do not move significantly relative to each other. If each pin or roller applies the same force, the maintained force is considered "uniform" even if parts of the area over which the generation line has passed are in contact with a roller or pin while others are in between rollers/pins.

Additional disclosure relevant to cold-forming 3D shapes can be found in PCT/US2015/039871 (WO2016/007815) to McFarland et al., entitled "Cold formed glass applique"; the disclosure of which is incorporated by reference in its entirety.

In some embodiments, cold-formed cover glass articles are provided, including articles with a complex 3D shape, as well as the forming process to make these cover glass articles. The glass layer in these cold-formed 3D cover glass articles is preferably strengthened glass, including thermally tempered, chemically strengthened, and/or glass laminates. In some embodiments, more preferably, this glass layer is Corning Gorilla glass.

Thin Corning Gorilla glass has a number of appealing attributes as cover glass for instrument panels and other displays, such as, higher scratch resistance, better optical performance, and better impact resistance. The superior surface stress structure, strength and thickness of Corning Gorilla glass enables the use of cold-forming to make 3D shapes, as stated in PCT/US2015/039871 (WO2016/007815), which is incorporated by reference in its entirety.

In some embodiments, a cold-forming process may be used to make the above-mentioned 3D cover glass articles. For example, a roller or pins (preferably of soft materials, for examples, of Teflon) are used to push the flexible glass substrate to conform to the shape of the rigid support structure, after a layer of adhesive is applied on the rigid support structure. Behind the roller, a flexible mold with multiple stiff pins (also preferably coated with Teflon, so as to avoid the issue of scratching glass) is closed to hold the cold formed glass in place.

In some embodiments, a flexible mold can be as wide as the top flexible glass substrate. In another case it also can be as narrow as 10 mm. In the latter case, the flexible mold can also be applied along the both edges and/or along the center line. In most cases, the roller starts from one side of the cover glass item, and moves toward the other end while aligned with the generation line of the developable surface. This method can avoid glass buckling and compound bending in the process of cold-forming, and hence can eliminate the risk of glass breakage caused by unwanted glass buckling and compound bending, and can enable cold bending to a smaller radius.

In some embodiments, the display can be attached to the flexible glass substrate by optical bonding, air gap bonding, or any suitable means.

Optical bonding, as referred to herein, is a method of attaching a glass substrate to a display using an optically transparent adhesive. The transparent adhesive is applied over the entire surface between the display and the glass substrate. This bonding method removes all air and air bubbles from the viewing or the display area. The removal of air and air bubbles between the display and the glass substrate eliminates surface-to-air reflections, thereby enhancing the contrast and viewing angles, especially significant in sunlight conditions. The most commonly used optical adhesives for optical bonding processes are silicone, epoxy and polyurethanes.

Air gap bonding, as referred to herein, is an alternative method of attaching a glass substrate to a display using an adhesive. In contrast to optical bonding, an adhesive is applied between the display and the glass substrate around the periphery of the display or the inactive areas of the display. Where the adhesive does not overlap with the viewing area of the display, the adhesive may be transparent or opaque. This method results in some "air gap" between the display and the glass substrate. Air gap bonding is the most effective and common bonding method used for touch screens and panels.

Some embodiments described herein have at least one of many advantages listed below:

i. Flexibility of manufacturing process:
        a. the display can be attached to the glass substrate or the rigid support structure.
        b. the display can be attached to the glass substrate either before or after the rigid support structure is attached to the glass substrate.
    ii. Improved lamination quality—The support structures are permanent, rigid fixtures that prevent any relative movement between the display and the glass substrate in the first during cold-forming of other portions of the substrate, improving the lamination quality.
    iii. Choice of materials for support structures—The support structures can be made of any material including metals, ceramics, alloys, reinforced plastic and rubber.
    iv. Stress isolation to prevent delamination—The fixed shape maintained by the support structures isolates any stress induced by further processing, thereby eliminating delamination of the display from the substrate.
    v. Ease of coating or surface treatment of glass substrate prior to cold-forming.
    vi. The proposed process improves lamination quality, enhances yield, and reduces cost while offering design flexibility.

The figures are not necessarily drawn to scale. The different parts of various figures may have some parts not drawn to scale relative to other parts in order to better illustrate concepts.

FIG. 1A illustrates a top view 100 of a flexible glass substrate 110 with a first rigid support structure 120. The first portion 130 of the flexible glass substrate 110 is the portion of the area of the flexible glass substrate 110 where the first rigid support structure 120 is fixed. The first portion 130 of the flexible glass substrate 110 has a first fixed shape 135. The boundaries of the first portion 130 coincide with the outer boundary of the first rigid support structure 120. A gap between the outer boundaries of the first rigid support structure 120 and the boundaries of the first portion 130 is shown and exaggerated for illustration purposes only. The first fixed shape 135 is not illustrated in the figures and it may have a planar or a non-planar shape.

The first portion 130 is illustrated in FIG. 1A as the dotted area around the first rigid support structure 120. The second portion 132 of the flexible glass substrate 110 is defined as the area of the flexible glass substrate 110 that is not fixed by the first rigid support structure.

In some embodiments, the first portion 130 of the flexible glass substrate 110 can be fixed with the first rigid support structure 120 by direct bonding, die molding, press molding or using any suitable means.

In some embodiments, the first rigid support structure 120 may be made of a material selected from the group metals, alloys, ceramics, plastics, rubbers, reinforced plastics, and glasses or combinations thereof.

In some embodiments, the first fixed shape 135 of the first portion 130 of the flexible glass substrate 110 may be a shape selected from the group circular, square, rectangular, polygon, triangular, and oval or combinations thereof.

Figure 1B:
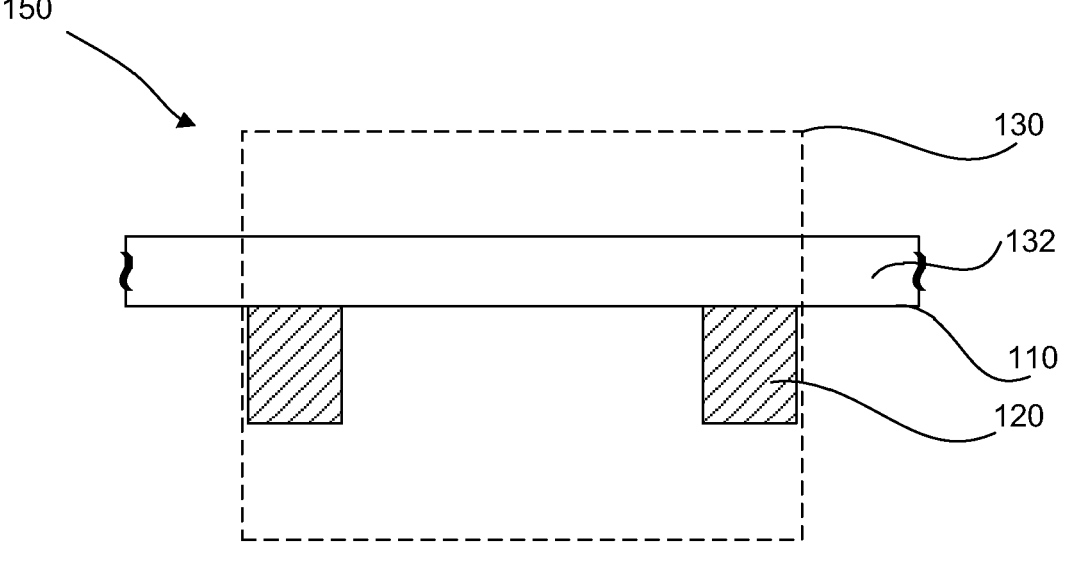
FIG. 1B illustrates a cross-section view of a glass substrate with a support structure, along 1-1' shown in FIG. 1A.

FIG. 1B illustrates a cross-section view 150 of the flexible glass substrate 110 with a first rigid support structure 120, corresponding to the plane 1-1' shown in FIG. 1A.

FIGS. 2-8 illustrate top views and corresponding cross-sections of various combinations of attaching the first display 140 to the first portion 130 of the flexible glass substrate 110 or to the first rigid support structure 120. Some of the possible combinations include, but are not limited to, a planar display attached to a planar glass substrate, a planar display attached to a non-planar glass substrate, a planar display attached to a rigid support structure, a non-planar display attached to a planar substrate, a non-planar display attached to a non-planar substrate, a non-planar display attached to a rigid support structure.

In some embodiments, further combinations may include various bonding methods such as optical bonding, or air gap bonding or any suitable means to attach the display to the glass substrate or the rigid support structure.

Figure 2A:
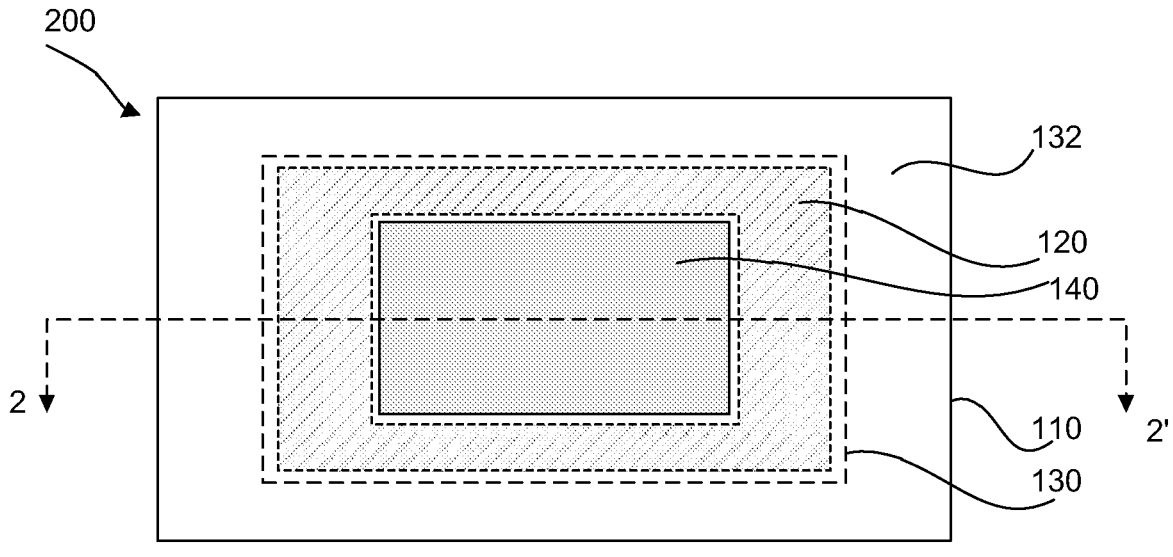
FIG. 2A illustrates a top view of a display directly attached to a glass substrate.

FIG. 2A illustrates a top view 200 of a first display 140 having a planar shape directly attached to the first portion 130 of the flexible glass substrate 110, also having a planar shape. In some embodiments, the first display 140 may be attached to the first portion 130 of the flexible glass substrate 110 via optical bonding.

Figure 2B:
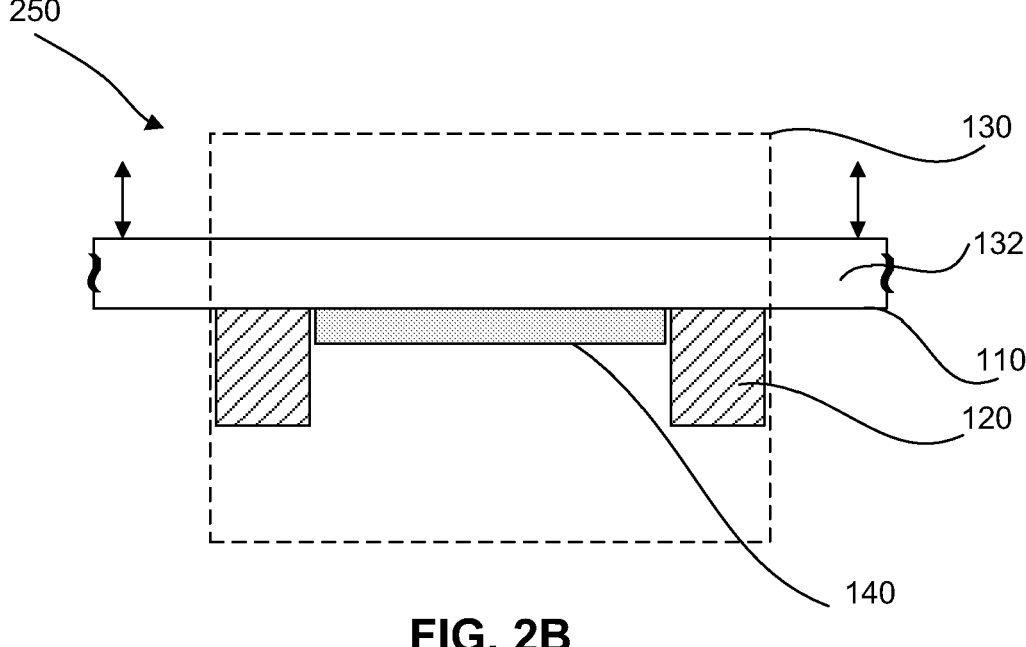
FIG. 2B illustrates a cross-section view of a display directly attached to a glass substrate, along 2-2' shown in FIG. 2A.

FIG. 2B illustrates a cross-section view 250 of the first display 140 having a planar shape directly attached to the first portion 130 of the flexible glass substrate 110, corresponding to the plane 2-2' shown in FIG. 2A.

Figure 3A:
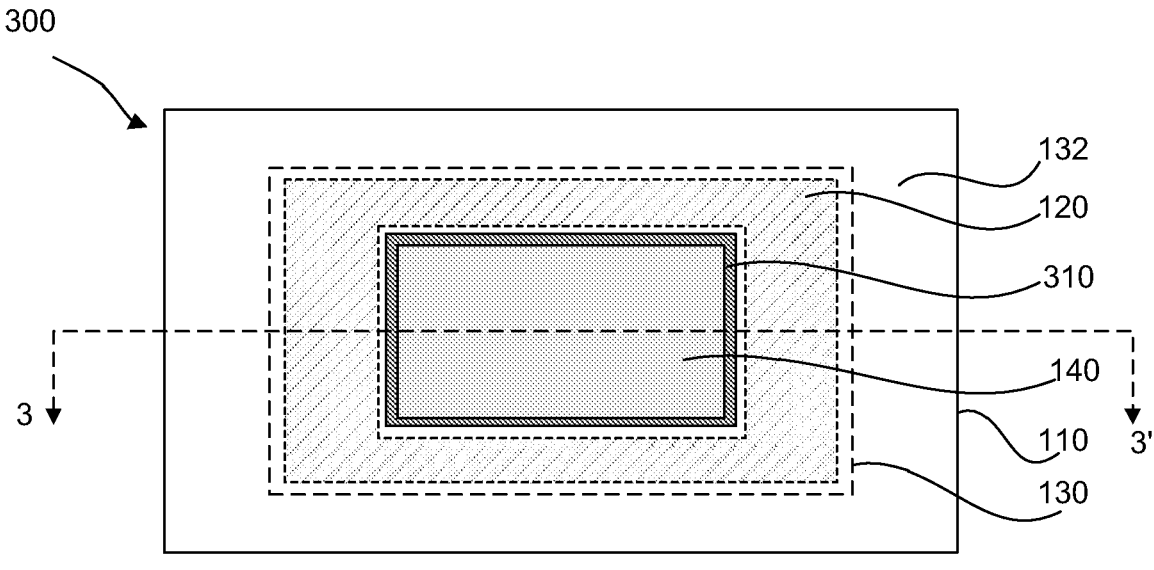
FIG. 3A illustrates a top view of a display attached to a glass substrate.

FIG. 3A illustrates a top view 300 of a first display 140 having a planar shape attached to the first portion 130 of the flexible glass substrate 110, also having a planar shape, via air gap bonding. The optical adhesive 310 may be applied around the periphery of the display such that a hermetic seal is created between the first display 140 and the flexible glass substrate 110. The air gap bonding method results in an air gap 320, defined as the inactive area between the display and the glass substrate.

In some embodiments, the area of the air gap 320 may vary depending on the method of attaching the display to the substrate or to the rigid support structure. The area of the air gap 320 may be larger where the display 140 is attached to the first rigid support structure 120 as compared to the flexible glass substrate 110.

Figure 3B:
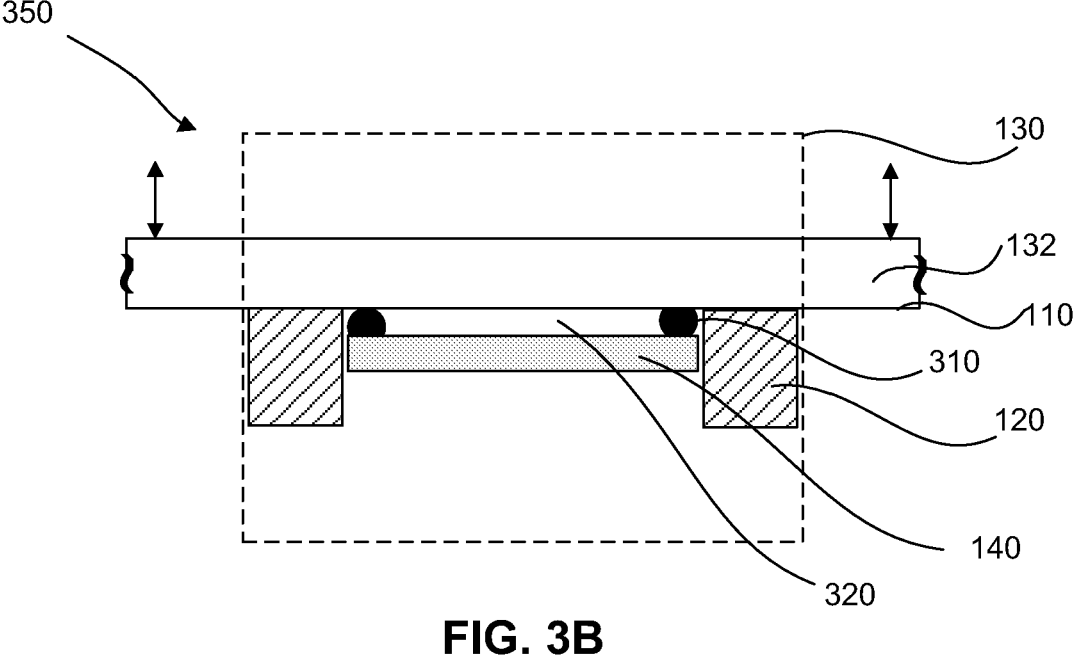
FIG. 3B illustrates a cross-section view of a display attached to a glass substrate, along 3-3' shown in FIG. 3A.

FIG. 3B illustrates a cross-section view 350 of the first display 140 having a planar shape attached to the first portion 130 of the flexible glass substrate 110, corresponding to the plane 3-3' shown in FIG. 3A.

Figure 4A:
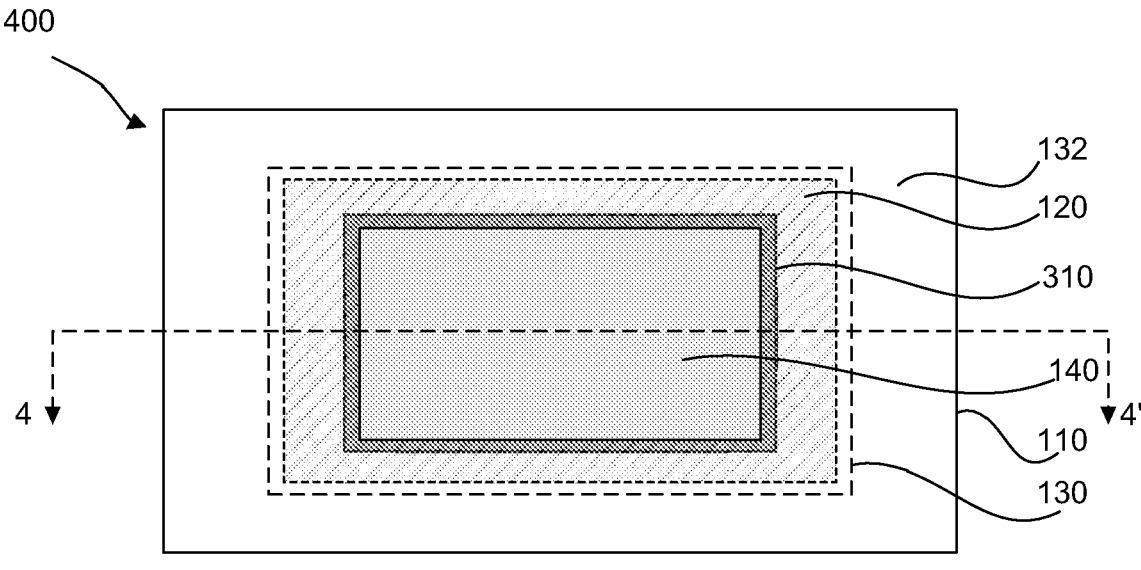
FIG. 4A illustrates a top view of a display attached to a support structure.

FIG. 4A illustrates a top view 400 of a first display 140 attached to the first rigid support structure 120 using an adhesive 310. In some embodiments, the first display 140 has a planar shape, same as the first fixed shape 135 of the first portion 130 of the flexible glass substrate 110.

Figure 4B:
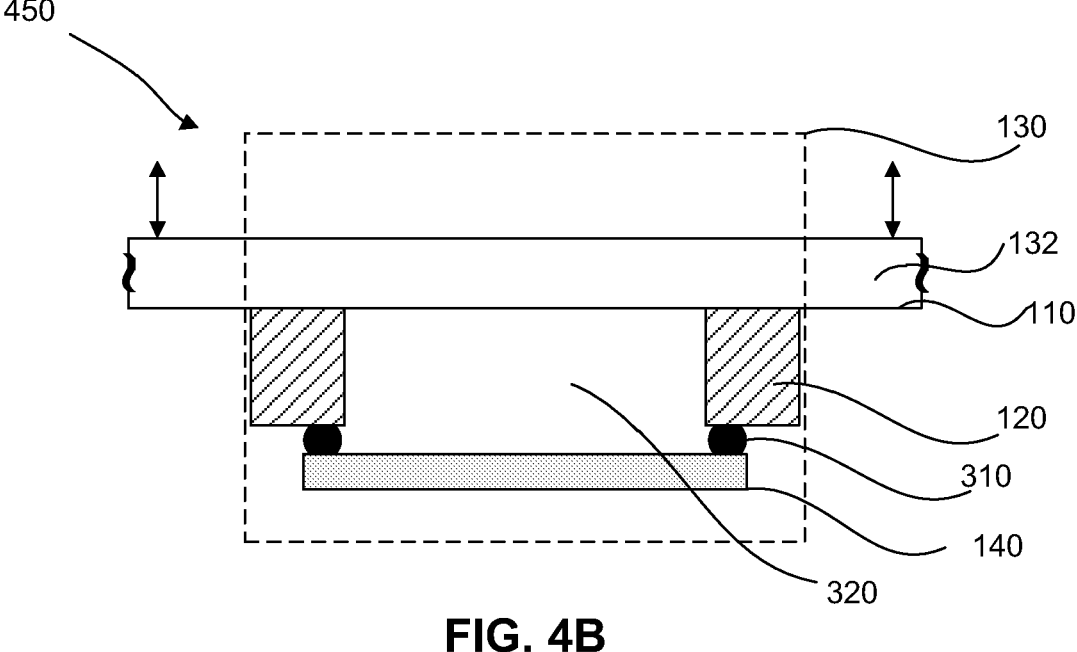
FIG. 4B illustrates a cross-section view of a display attached to a support structure, along 4-4' shown in FIG. 4A

FIG. 4B illustrates a cross-section view 450 of the first display 140 attached to the first rigid support structure 120 using an optical adhesive 310, corresponding to the plane 3-3' shown in FIG. 3A.

Figure 5:
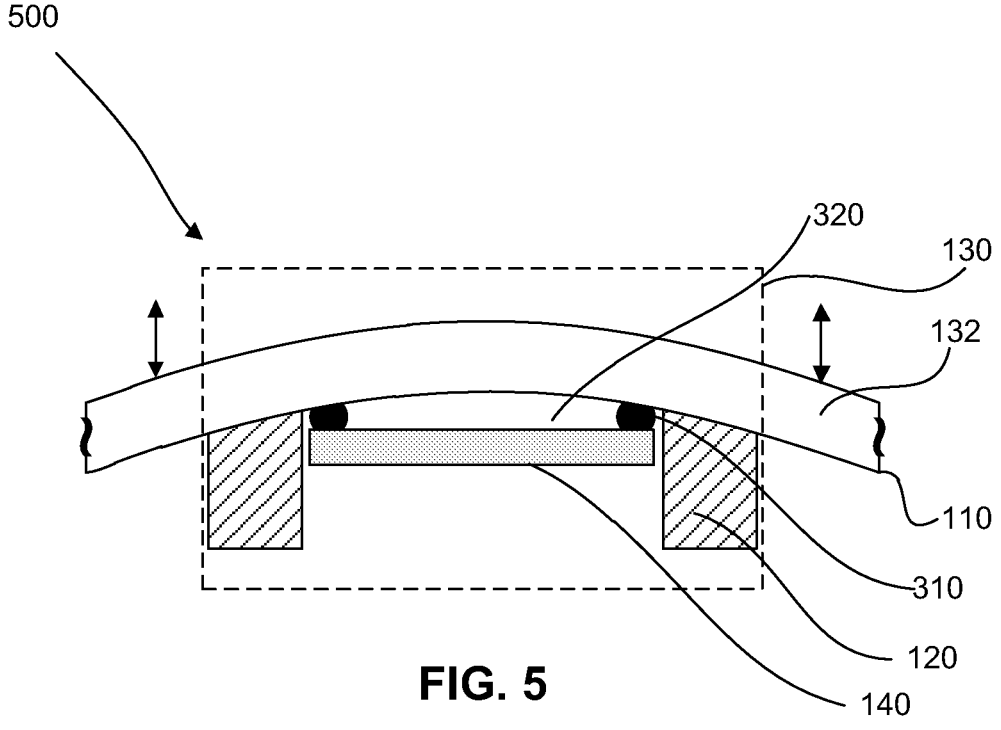
FIG. 5 illustrates a cross-section view of a planar display attached to a non-planar glass substrate.

FIG. 5 illustrates a cross-section view 500 of a first display 140 attached to the flexible glass substrate 110 via air gap bonding using the optical adhesive 310. In some embodiments, the first display 140 has a planar shape and the first fixed shape 135 of the first portion 130 of the flexible glass substrate 110 is non-planar.

Figure 6:
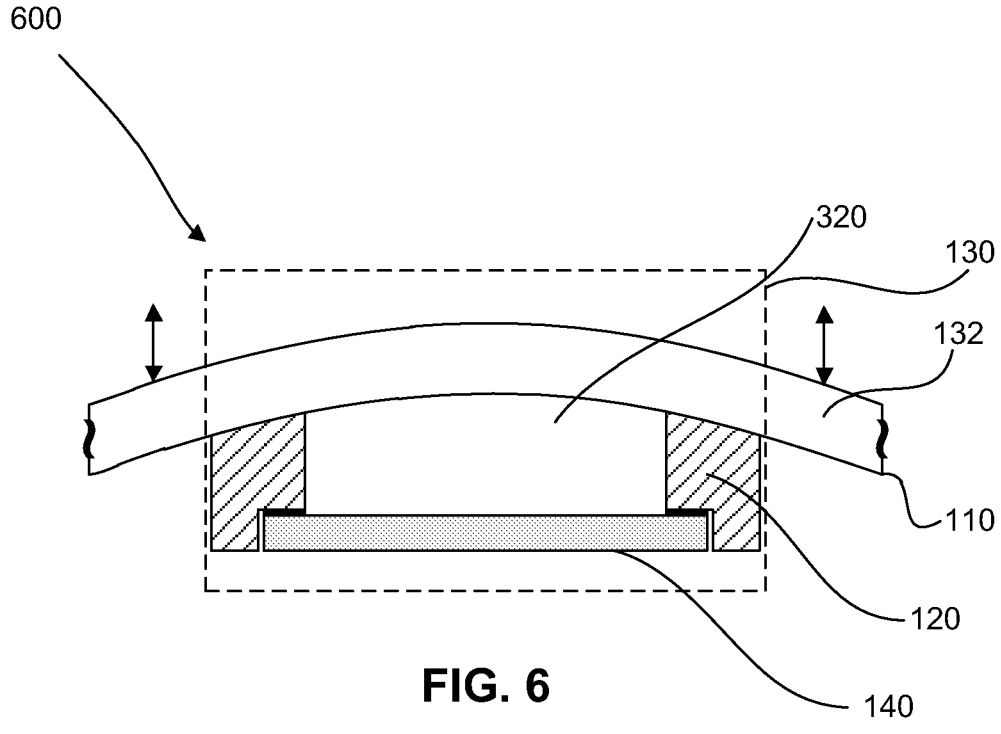
FIG. 6 illustrates a cross-section view of a non-planar glass substrate covering a planar display attached to a support structure.

FIG. 6 illustrates a cross-section view 600 of a first display 140 attached to the first rigid support structure 120 via air gap bonding, optical bonding, or by any suitable means. In some embodiments, the first display 140 has a planar shape and the first fixed shape 135 of the first portion 130 of the flexible glass substrate 110 is non-planar.

Figure 7:
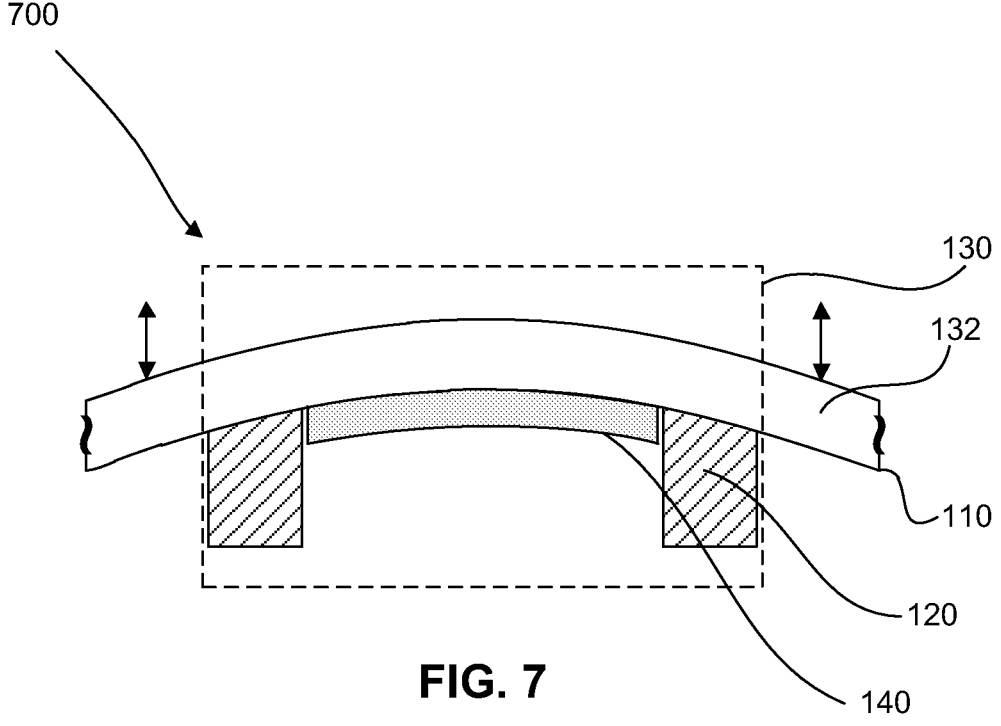
FIG. 7 illustrates a cross-section view of a non-planar display directly attached to a non-planar glass substrate.

FIG. 7 illustrates a cross-section view 700 of a first display 140 directly attached to the flexible glass substrate 110 via optical bonding, direct bonding, or by any suitable means. In some embodiments, the first display 140 has a non-planar shape and the first fixed shape 135 of the first portion 130 of the flexible glass substrate 110 is non-planar.

Figure 8:
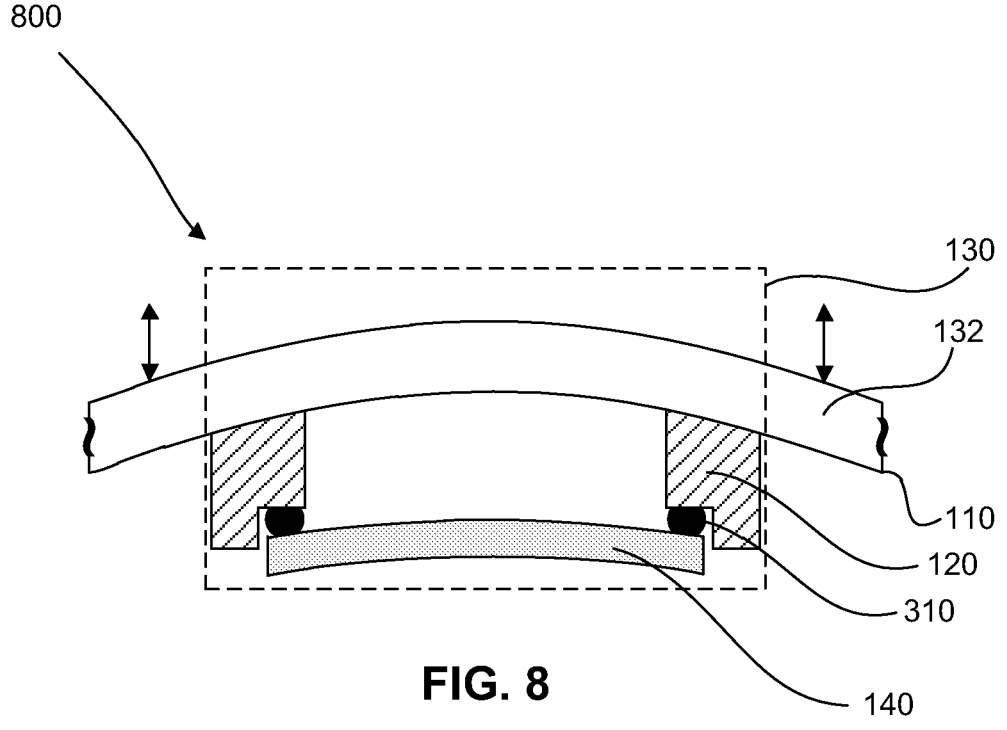
FIG. 8 illustrates a cross-section view of a non-planar glass substrate covering a non-planar display attached to a support structure.

FIG. 8 illustrates a cross-section view 800 of a first display 140 attached to the first rigid support structure 120 via air gap bonding, optical bonding, direct bonding, or by any suitable means. In some embodiments, the first display 140 has a non-planar shape and the first fixed shape 135 of the first portion 130 of the flexible glass substrate 110 is non-planar.

In some embodiments, the first display 140 is attached to the first portion 130 of the flexible glass substrate 110 after fixing the first portion 130 of the flexible glass substrate 110 with a first rigid support structure 120 into a fixed first shape 135.

Figure 9A:
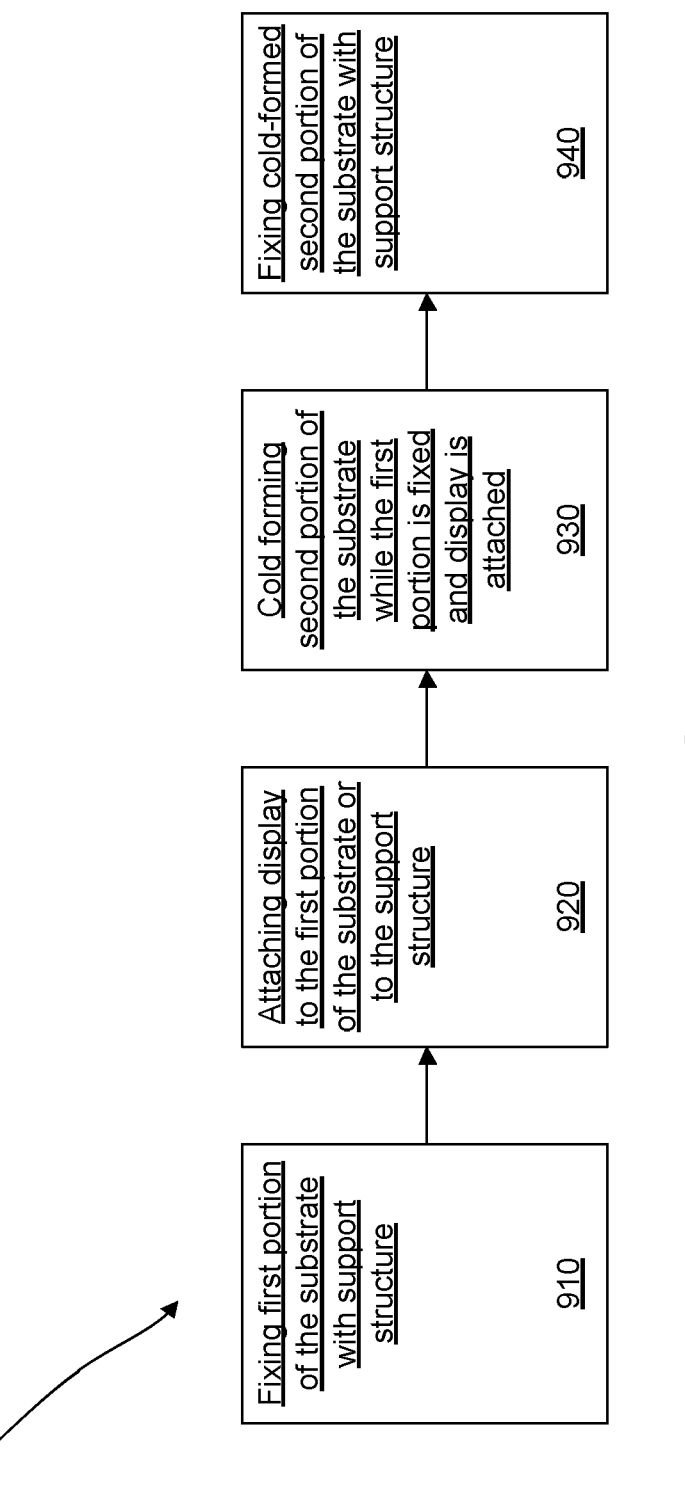
FIGS. 9A and 9B show process flowcharts of attaching displays to a cold-formed glass substrate.

FIG. 9A illustrates a process flow chart of attaching a display to the first portion 130 of the flexible glass substrate 110 after fixing the first portion of the substrate with a rigid support structure into a fixed first shape. The steps are performed in the following order:

Step 910: fixing a first portion 130 of a flexible glass substrate 110 into a first fixed shape 135 with a first rigid support structure 120;

Step 920: attaching a first display 140 to the first portion 130 of the flexible glass substrate 110 or to the first rigid support structure 120;

Step 930: after fixing the first portion 130 and attaching the first display 140, and while maintaining the first fixed shape 135 of the first portion 130 of the flexible glass substrate 110 and the attached first display 140, cold-forming a second portion 132 of the flexible glass substrate 110 to a second fixed shape 137;

Step 940: fixing the second portion 132 of the flexible glass substrate 110 into the second fixed shape 137 with a second rigid support structure 125.

In some embodiments, wherein the first display 140 is planar and the first fixed shape 135 is planar, the display 140 is attached to the first portion 130 of the flexible glass substrate 110 before fixing the first portion 130 of the flexible glass substrate 110 with a first rigid support structure 120 into a fixed first shape 135.

Figure 9B:
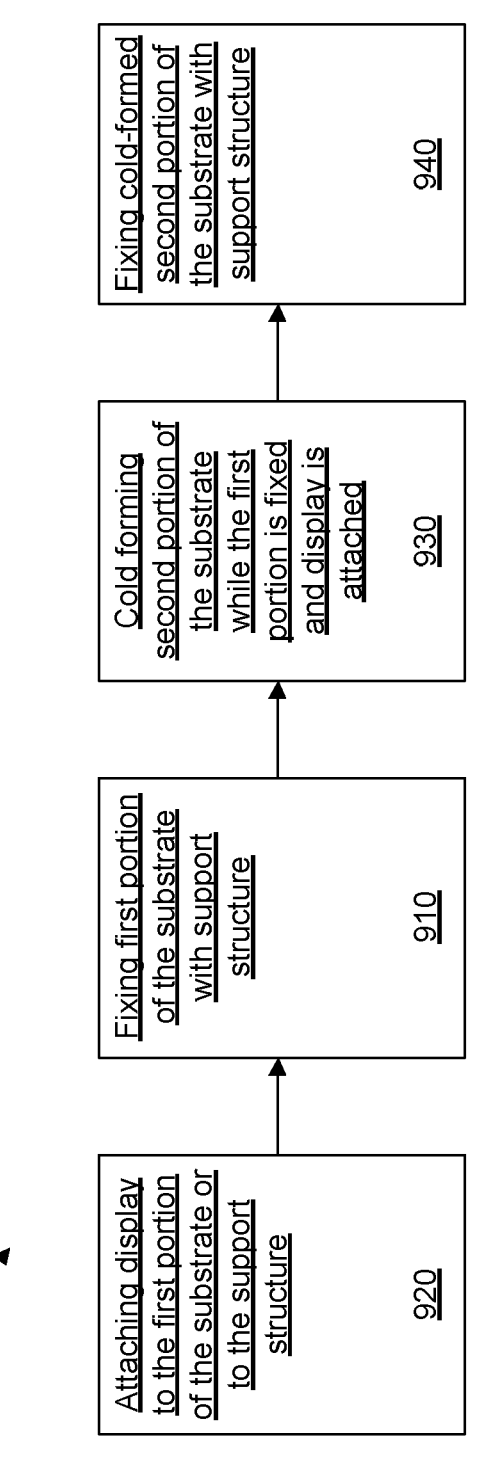

FIG. 9B illustrates a process flow chart of attaching a display to the first portion 130 of the flexible glass substrate 110 before fixing the first portion of the substrate with a rigid support structure into a fixed first shape. The steps are performed in the following order:

Step 920: attaching a first display 140 to the first portion 130 of the flexible glass substrate 110 or to the first rigid support structure 120;

Step 910: fixing a first portion 130 of a flexible glass substrate 110 into a first fixed shape 135 with a first rigid support structure 120;

Step 930: after fixing the first portion 130 and attaching the first display 140, and while maintaining the first fixed shape 135 of the first portion 130 of the flexible glass substrate 110 and the attached first display 140, cold-forming a second portion 132 of the flexible glass substrate 110 to a second fixed shape 137;

Step 940: fixing the second portion 132 of the flexible glass substrate 110 into the second fixed shape 137 with a second rigid support structure 125.

Figure 10A:
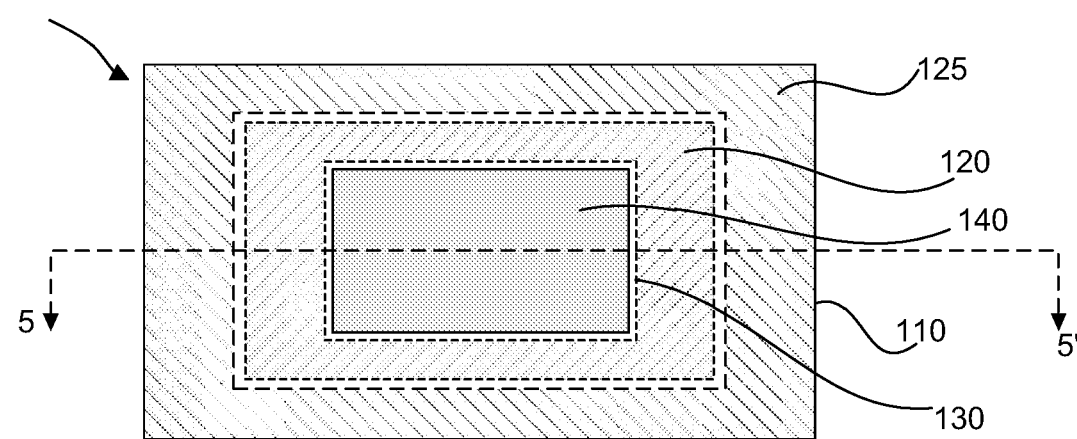
FIG. 10A illustrates a top view of a display directly attached to a glass substrate and a cold-formed portion of the substrate with a second rigid support structure.

FIG. 10A illustrates a top view 1000 of a display 140 attached to the first portion 130 of the flexible glass substrate 110 and a second portion 132 of the flexible glass substrate 110 cold-formed into a non-planar shape and fixed into the second fixed shape 137 by the second rigid support structure 125. The non-planarity of the second portion 132 of the flexible glass substrate 110 cannot be illustrated in FIG. 10A due to the viewing angle. In this embodiment, a planar display is attached to the planar first portion of a planar flexible glass substrate, but it should be understood and appreciated that a number of other combinations of substrate and display shapes are also possible.

Figure 10B:
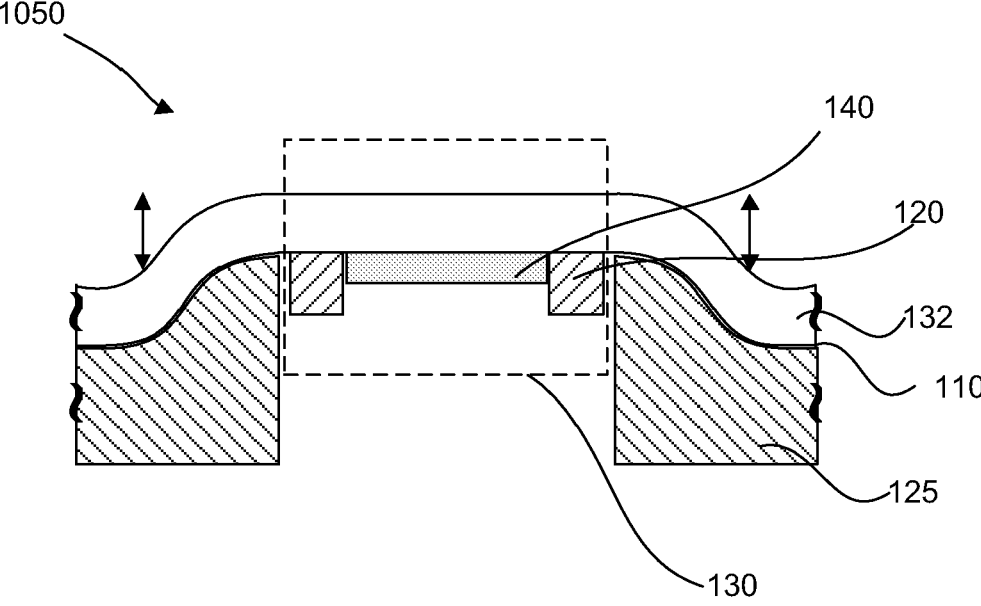
FIG. 10B illustrates a cross-section view of a display directly attached to a glass substrate and a cold-formed, non-planar portion of the substrate with a second rigid support structure, along 5-5' shown in FIG. 10A.

FIG. 10B illustrates a cross-section view 1050, along 5-5' shown in FIG. 10A, of a display 140 attached to the first portion 130 of the flexible glass substrate 110 and a second portion 132 of the flexible glass substrate 110 cold-formed into a non-planar shape and fixed into the second fixed shape 137 by the second rigid support structure 125.

In some embodiments, as discussed earlier, the first display 140 may be attached to the first portion 130 of the flexible glass substrate 110 or to the first rigid support structure in various combinations, while the second portion 132 of the flexible glass substrate is cold-formed into a non-planar shape.

In some embodiments, a planar display 140 is attached to a non-planar first portion 130 of the flexible glass substrate 110 using an optical adhesive 310 while the second portion 132 of the flexible glass substrate is cold-formed into a non-planar shape.

In some embodiments, a planar display 140 is attached to the first rigid structure 120 by suitable means while the second portion 132 of the flexible glass substrate is cold-formed into a non-planar shape.

In some embodiments, a non-planar display 140 is attached to a non-planar first portion 130 of the flexible glass substrate 110 using an optical adhesive 310 while the second portion 132 of the flexible glass substrate is cold-formed into a non-planar shape.

In some embodiments, a non-planar display 140 is attached to the first rigid structure 120 by suitable means while the second portion 132 of the flexible glass substrate is cold-formed into a non-planar shape.

The proposed process variations and design options of attaching the display to the first portion of the flexible glass substrate renders the manufacturing process very flexible and maintain superior quality.

Figure 11:
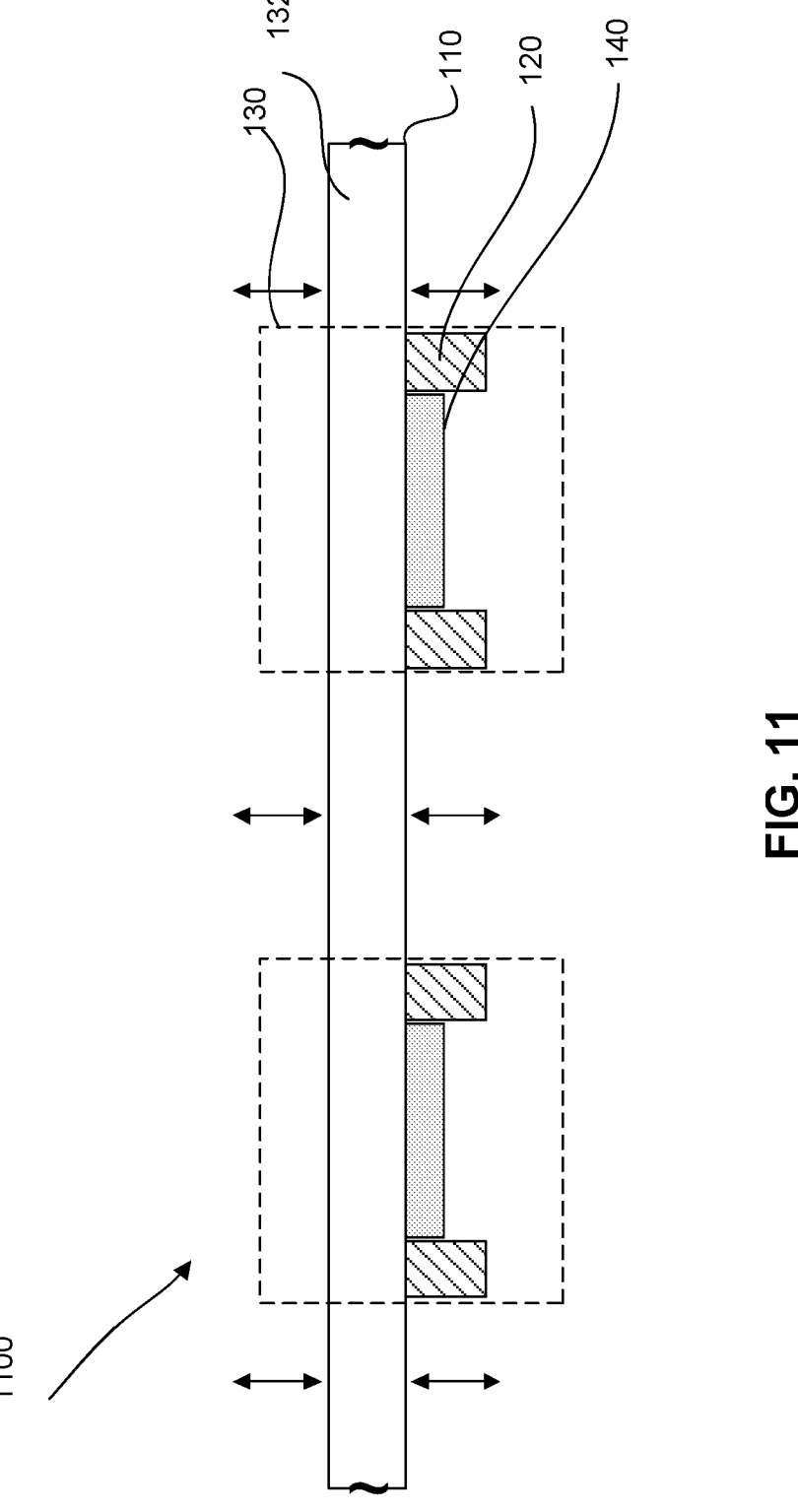
FIG. 11 illustrates a cross-section view of two displays directly attached to a glass substrate.

In some embodiments, one or more first displays 140 may be attached to one or more first portions 130 of the flexible glass substrate 110 such that the displays 140 are not in direct contact with each other. FIG. 11 illustrates a cross-section view 1100 of two first displays 140 attached to two first portions 130 of the flexible glass substrate 110 separated by a second portion 132 of the flexible glass substrate 110. In some embodiments, the first portions 130 may have a planar shape, or may have a non-planar shape, or one of the first portions 130 may have a planar and the other one may have a non-planar shape. The second portion 132 may be cold-formed into a second fixed shape 137 that is non-planar, not illustrated in FIG. 11. The first display 140 may be attached either to the flexible glass substrate 110 or to the first rigid support structure 120 in any of the various combinations described above.

Figure 12:
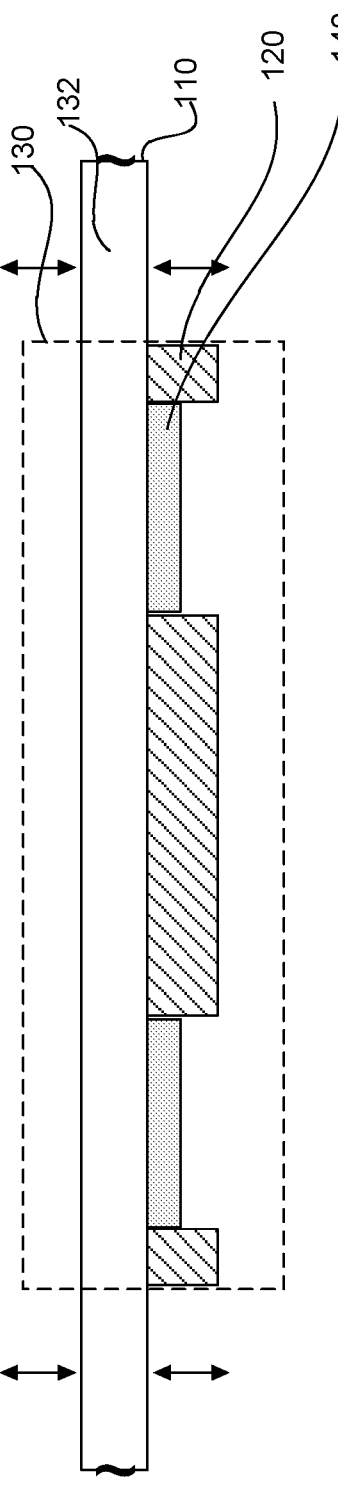
FIG. 12 illustrates a cross-section view of two adjacent displays directly attached to a glass substrate.

In some embodiments, one or more first displays 140 may be attached to the first portion 130 of the flexible glass substrate 110 such that the displays 140 are separated by a portion of the first rigid support structure 120. FIG. 12 illustrates a cross-section view 1200 of two first displays 140 attached to a first portion 130 of the flexible glass substrate 110 separated by portion of the first rigid support structure 120.

In some embodiments, the process may further comprise fixing a third portion of the flexible glass substrate into a third fixed shape with a third rigid support structure; attaching a second display to the third portion of the flexible glass substrate or to the third rigid support structure; wherein cold-forming the second portion of the flexible glass substrate to the second fixed shape and fixing the second portion of the flexible glass substrate into the second fixed shape with the second rigid support structure is performed after fixing the third portion and attaching the second display, and while maintaining the third fixed shape of the third portion of the flexible glass substrate and the attached second display.

Figures 13A, 13B:
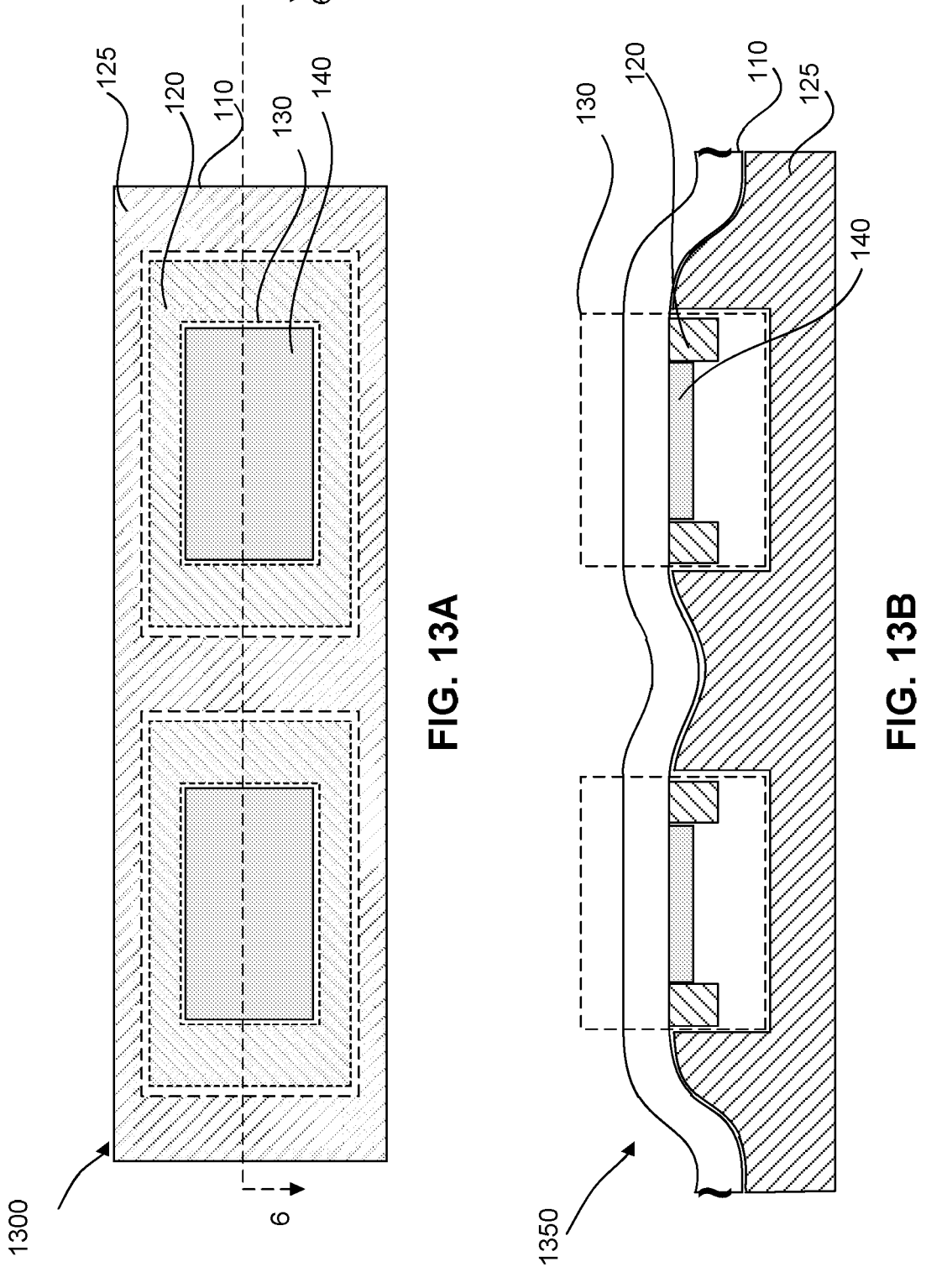
FIG. 13A illustrates a top view of two displays directly attached to the planar first portion of the glass substrate and cold-formed, non-planar portions of the substrate supported with a rigid support structure.
FIG. 13B illustrates a cross-section view of two displays directly attached to the planar first portion of the glass substrate and cold-formed, non-planar portions of the substrate supported with a rigid support structure, along 6-6' shown in FIG. 13A.

FIG. 13A illustrates a top view 1300 of two displays 140 attached to the first portions 130 of the flexible glass substrate 110 such that the displays 140 are not in direct contact with each other and separated by the second rigid support structure 125. The second portion 132 of the flexible glass substrate 110 is cold-formed and fixed into a second fixed shape 137 by the second rigid support structure 125. The fixed second shape 137 is non-planar.

The non-planarity of the second portion 132 after cold-forming is not visible in FIG. 13A due to the top viewing angle, but is clearly seen in FIG. 13B, a cross-section view 1350 of FIG. 13A corresponding to the 6-6' plane.

Figure 14:
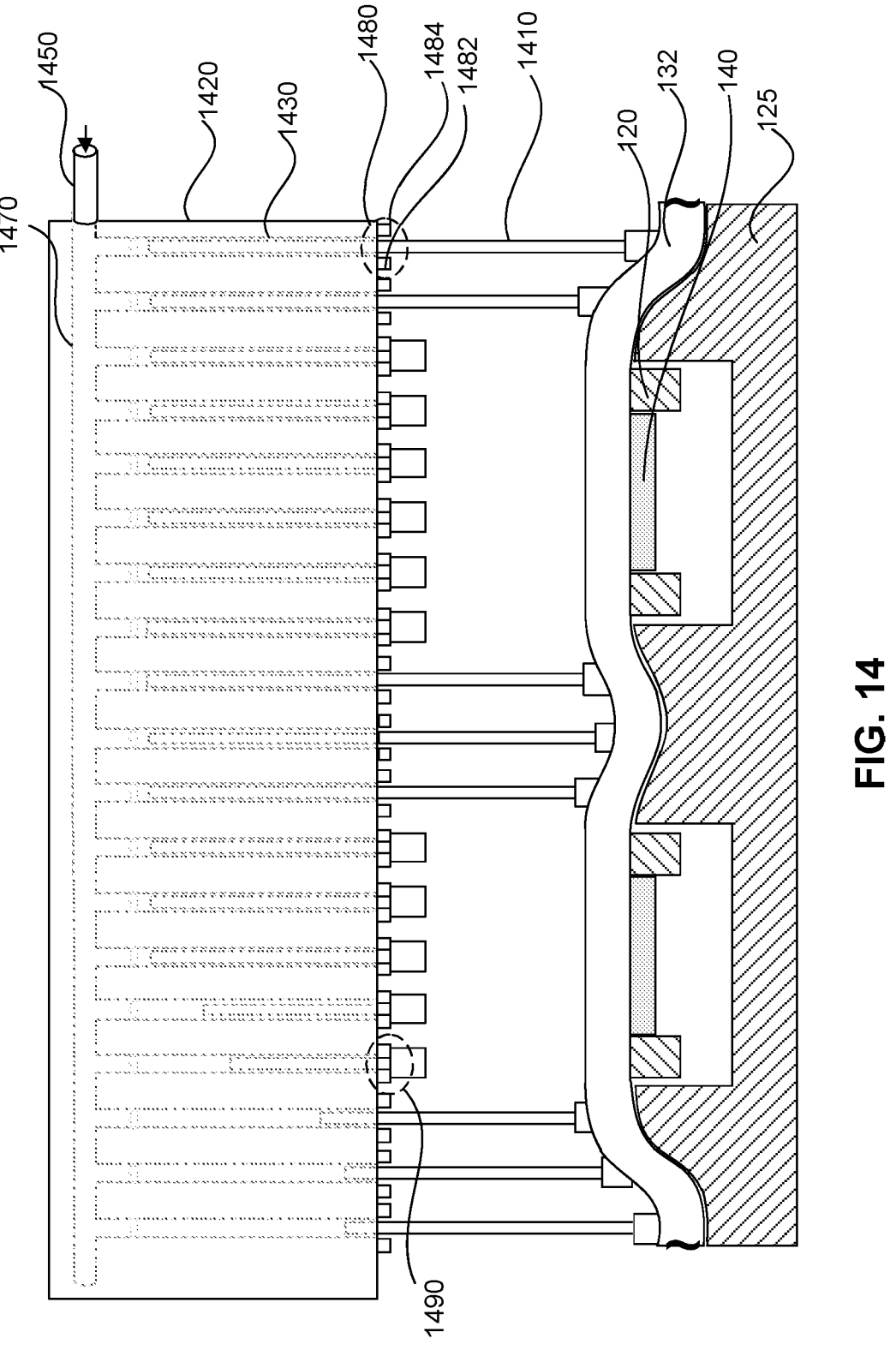
FIG. 14 illustrates the cold-forming process wherein the pins are selectively activated to press the glass substrate against the adhesive layer and support structure.

FIG. 14 illustrates a process 1400 of cold-forming the second portion 132 of the flexible glass substrate 110 using sequentially activated pins 1410. The pin block 1420 may have cavities 1430 drilled or machined through a portion of the height of the pin block such that the pins 1410 can move up and down determined by the contour of the portion of the second rigid support structure 125 coated with an adhesive (not shown in the figure), against which the flexible glass substrate 110 is being pressed. The length of the pins 1410 protruding out of the pin block 1420 can be adjusted using a clamping mechanism. In some embodiments, the clamps 1482 and 1484 operate by receiving an input signal from an actuator, for example, clamps 1482 and 1484 are shown in a locked configuration 1490 and clamps 1482 and 1484 are shown in an unlocked configuration 1480.

In some embodiments, the pin block 1420 houses a pressure manifold 1470, connected with an inlet connector 1450, to apply and maintain a constant pressure on the pins 1410 through cavities 1430. The movement of the pins 1410 in the vertical direction can be controlled by an actuator mechanism.

In some embodiments, the pins 1410 may have a cross-section selected from the group consisting of cylindrical, triangular, and rectangular. The pins 1410 may be made of a material selected from the group consisting of metals, ceramics, plastics, composites, rubber, and combinations thereof.

The actuator mechanism may be selected from the group comprising hydraulic, pneumatic, electric, and mechanical input signals, or combinations thereof. In some embodiments, an individual pin, a column of pins, a row of pins, an array of pins or any combinations thereof can be actuated to apply or not apply the force on the flexible glass substrate 110.

In some embodiments, a column of pins 1410 may be sequentially actuated such that the initial force is applied by actuating one or more pins; the generation line is defined by the position of the pins most recently actuated; and the application of force is maintained by actuated pins that do not move relative to the flexible substrate 110 after the generation line has passed, and until the adhesive is cured.

In some embodiments, pins 1410 may be individually actuated such that only the second portions 132 of the flexible glass substrate 110 are pushed against the second rigid support structure 125.

In some embodiments, all pins 1410 in a pin block 1420 may be simultaneously actuated, with the clamps 1482 and 1484 in the unlocked configuration 1480, such that the initial force is applied by all the actuated pins; the generation line is defined by the position of the column of leading pins 1410; moving the generation line across the substrate to cold-form the flexible glass substrate 110 into the shape of the second rigid support structure 125, while maintaining the application of force on areas of the flexible substrate 110 over which the generation line has passed until the adhesive cures.

In some embodiments, the adhesive applied on the second rigid support structure 125 is preferably a high-strength structural adhesive. Exemplary high-strength structural adhesives include Loctite high-purity M-121 HP Epoxy, 3M Scotch Weld DP 420 Epoxy, Loctite H4800 Acrylics, 3M Auto Glass Windshield Urethane, and CRL Dow Corning 995 Silicone.

In some embodiments, the cavities 1430 are connected to the pressure manifold 1470. The pressure in the pressure manifold 1470 can be created by any suitable means 1460, such as compressed air or oil through the inlet connector 1450.

In some embodiments, a roller, a roller tape, pins, a roller attached to an end of a pin or any combinations thereof may be used to apply and maintain pressure on the flexible glass substrate 110 as it is being pushed against the second support structure 125.

Figure 15A:
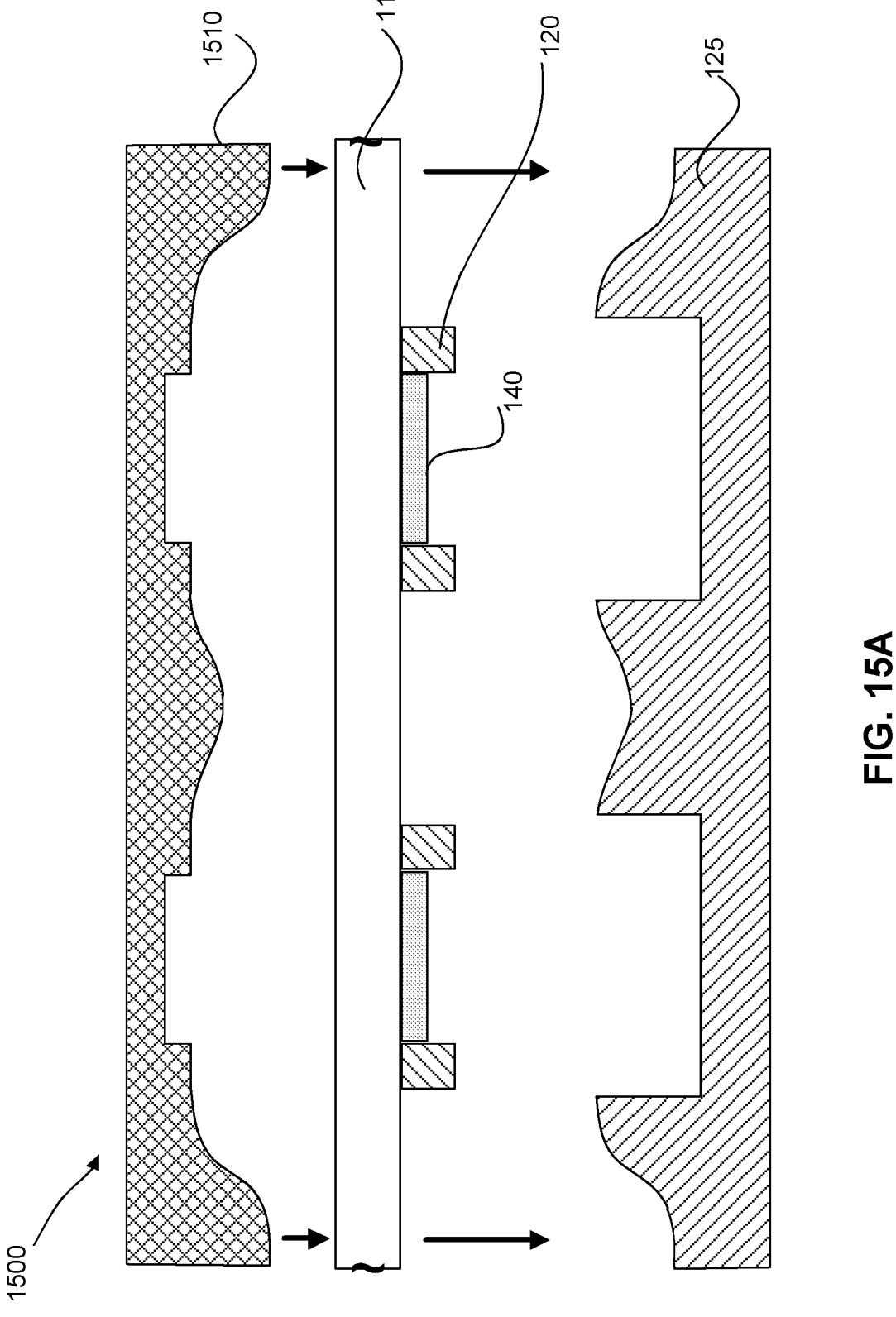
FIG. 15A illustrates an exemplary press molding process wherein a mold presses the glass substrate against a rigid support structure.

FIG. 15A shows an exemplary process of press molding 1500. The process comprises pushing the press mold 1510 against the flexible glass substrate 110 to which the displays 140 and the first rigid support structures 120 are attached. During bonding, as the press mold 1510 pushes down on the flexible glass substrate 110 against the adhesive (not shown) and the underlying second rigid support structure 125, tensile stresses, compressive stresses or a combination thereof may be generated in the flexible glass substrate 110. This stress may result in breakage for some percentage of articles, reducing yield. Furthermore, the flexible glass substrate 110 may slide against the uncured adhesive potentially affecting the thickness uniformity and the conformality of adhesive layer. Some embodiments described herein such as cold-forming of chemically-strengthened or thermally-strengthened, improve upon the press molding process, particularly for articles having a developable and/or complex developable shape, by providing sufficient glass strength to overcome the stress created in the flexible glass substrate 110 during processing, thereby increasing yield relative to press molding and similar processes. The arrows indicate the direction of the movement of the mold and the flexible glass substrate 110 to which the displays 140 and the first rigid support structures 120 are attached.

Figure 15B:
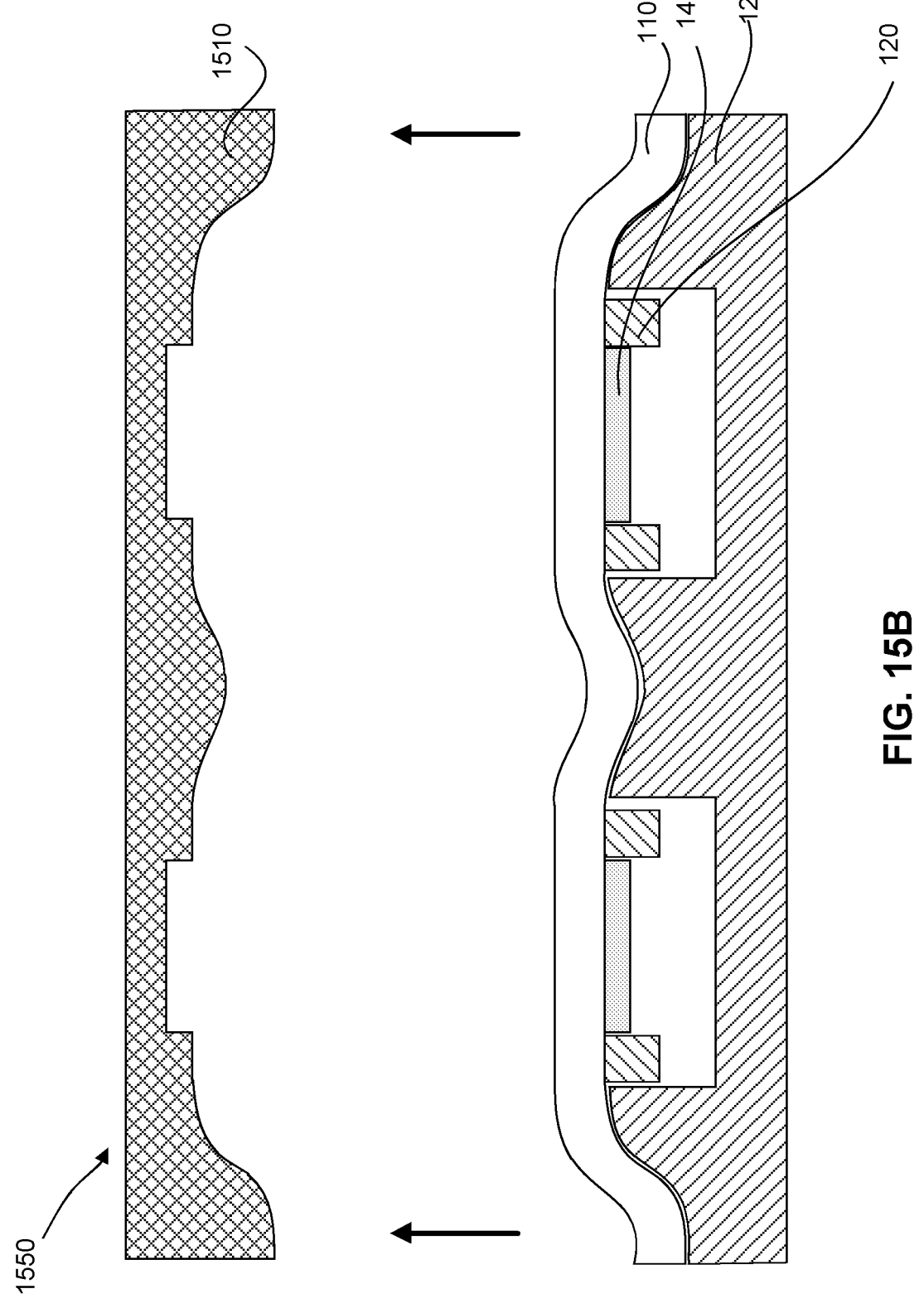
FIG. 15B illustrates a press-molded, cold-formed article. After press-molding, the press-mold is withdrawn.

FIG. 15B shows a process step 1550 of the press molding process, where the press mold is retracted once the second portion 132 of the flexible glass substrate 110 is pressed into the shape of the second rigid support structure 125, forming the desired end product. The arrows indicate the direction of the movement of the press mold away from the end product once the process is finished.

Figure 16:
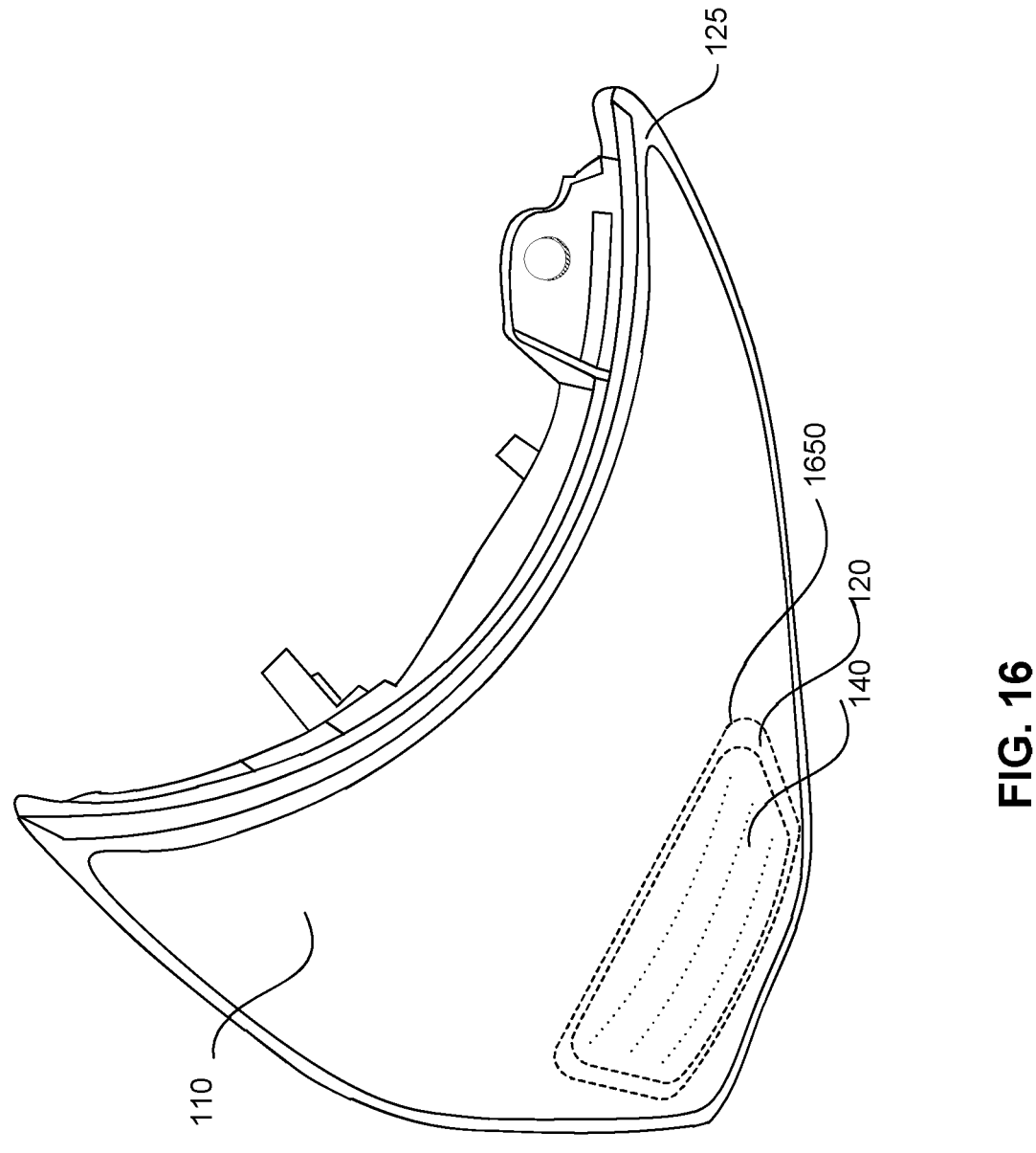
FIG. 16 illustrates an automotive interior display comprising a cold-formed glass substrate bonded to a non-planar rigid support structure.

FIG. 16 shows an example of a part 1600, a section of an automotive interior display, including but not limited to an instrument cluster, a console display, or a center stack display, having a monitor, that may be made in some embodiments. A cold-formed flexible glass substrate 110 is bonded to a second rigid support structure 125. The cold-formed glass substrate 110 includes an open region 1650 that is not in direct contact with the second non-planar rigid support structure 125. Open region 1650 may have a non-planar shape maintained by the first rigid support structure 120. A monitor or a display 140 may be laminated to open region 1650. Rigid support structure 125 may be designed to be attached to other parts of an automobile.

In some embodiments, the display 140 is attached to the flexible glass substrate 110 after fixing the flexible glass substrate 110 into a fixed shape with a rigid support structure 125 and cold-forming the fixed flexible glass substrate 110 into the fixed shape. The cold-formed flexible glass substrate 110 may have one or more portions having a planar shape and one or more portions having a non-planar shape. The cold-formed flexible glass substrate 110 may have, but not limited to, a complex developable shape, a developable shape or a combination thereof.

Figures 17A, 17B:
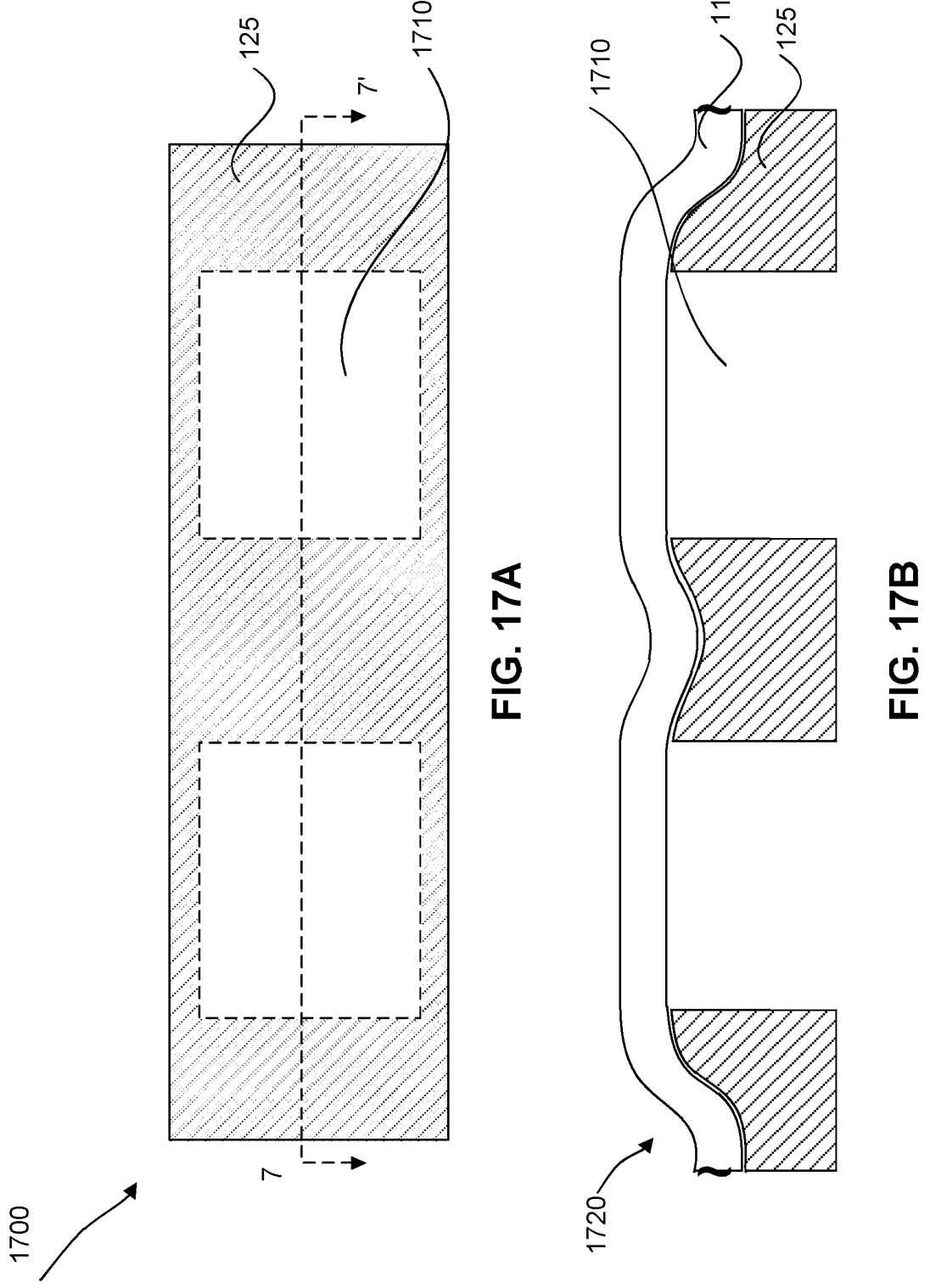
FIGS. 17A and 17B illustrate a top view and a cross-section view, respectively of a rigid support structure fixed to the glass substrate.

FIG. 17A illustrates a top view 1700 of the flexible glass substrate 110 with a rigid support structure 125. FIG. 17B illustrates a cross-section view 1720, along 7-7' shown in FIG. 17A. Along the 7-7' plane, the rigid support structure 125 has one or more openings 1710 through which a display can be attached to the cold-formed flexible glass substrate 110 after the cold-forming is finished.

Figures 17C, 17D:
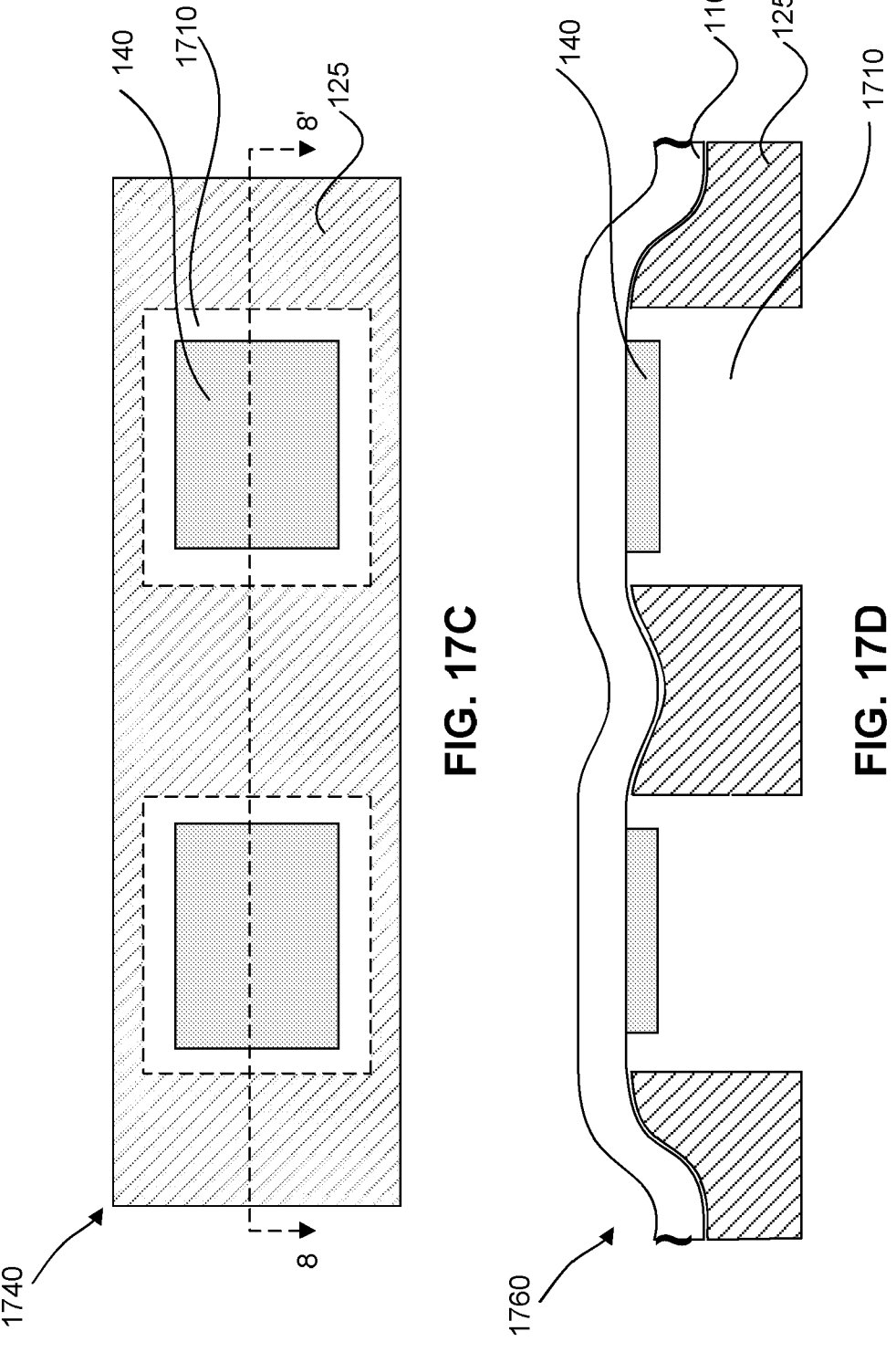
FIGS. 17C and 17D illustrate a top view and a cross-section view, respectively of displays attached to the glass substrate while the rigid support structure is fixed.

FIG. 17C illustrates a top view 1740 of the cold-formed flexible glass substrate 110 with a rigid support structure 125 and displays 140 attached to the cold-formed glass substrate. FIG. 17D illustrates a cross-section view 1760, along the 8-8' plane shown in FIG. 17C.

In some embodiments, cold forming of the flexible glass substrate 110 can be prior to attachment to the rigid support structure 125, for example, using injection molding, press molding, or any suitable means.

In some embodiments, cold forming of the flexible glass substrate 110 can be performed at the same time as the attachment to the rigid support structure 125, for example, using roller tapes, pins, or any suitable means.

Figure 18:
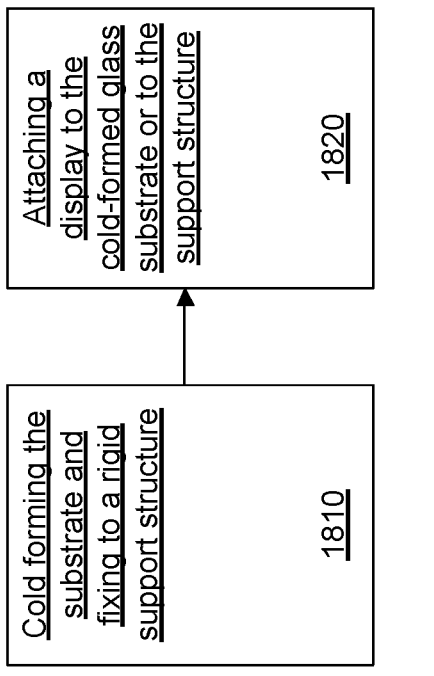
FIG. 18 shows a flowchart of a process where the display is attached after the fixing the rigid support structure and cold-forming the glass substrate.

FIG. 18 shows a process flowchart of attaching a display 140 to the flexible glass substrate 110 after cold-forming the flexible glass substrate 110 and bonding to a rigid support structure 125. The steps are performed in the following order:

Step 1810: Cold forming the flexible glass substrate 110 and fixing to a rigid support structure 125.

Step 1820: attaching a display 140 to the flexible glass substrate 110 or to the rigid support structure through the opening 1710.

Aspect (1) of this disclosure pertains to a process comprising fixing a first portion of a flexible glass substrate into a first fixed shape with a first rigid support structure; attaching a first display to the first portion of the flexible glass substrate or to the first rigid support structure; after fixing the first portion and attaching the first display, and while maintaining the first fixed shape of the first portion of the flexible glass substrate and the attached first display: cold-forming a second portion of the flexible glass substrate to a second fixed shape; and fixing the second portion of the flexible glass substrate into the second fixed shape with a second rigid support structure.

Aspect (2) of this disclosure pertains to the process of Aspect (1), wherein the first display is planar; the first fixed shape is planar; and the first portion of the flexible glass substrate is fixed into the first fixed shape with the first rigid support structure after attaching the first display to the first portion of the flexible glass substrate.

Aspect (3) of this disclosure pertains to the process of Aspect (1), wherein the first portion of the flexible glass substrate is fixed into the first fixed shape with the first rigid support structure before attaching the first display to the first portion of the flexible glass substrate.

Aspect (4) of this disclosure pertains to the process of Aspect (1) or Aspect (2), wherein the first fixed shape is planar.

Aspect (5) of this disclosure pertains to the process of Aspect (1) or Aspect (3), wherein the first fixed shape is non-planar.

Aspect (6) of this disclosure pertains to the process of Aspect (1) or Aspect (3), wherein the first display is non-planar.

Aspect (7) of this disclosure pertains to the process of any one of Aspects (1) through (6), wherein the first fixed shape is formed by cold-forming the first portion of the flexible glass substrate.

Aspect (8) of this disclosure pertains to the process of any one of Aspects (1) through (7), wherein the shape of the first display is the same as the first fixed shape.

Aspect (9) of this disclosure pertains to the process of any one of Aspects (1) through (8), wherein the first rigid support structure is permanently attached to the first portion of the flexible glass substrate.

Aspect (10) of this disclosure pertains to the process of any one of Aspects (1) through (9), wherein the second fixed shape is non-planar.

Aspect (11) of this disclosure pertains to the process of any one of Aspects (1) through (10), wherein the second rigid support structure is permanently attached to the second portion of the flexible glass substrate.

Aspect (12) of this disclosure pertains to the process of any one of Aspects (1) through (11), wherein the first display is attached to the flexible glass substrate or to the first rigid support structure using a method selected from optical bonding, or air gap bonding.

Aspect (13) of this disclosure pertains to the process of any one of Aspects (1) through (12), further comprises: fixing a third portion of the flexible glass substrate into a third fixed shape with a third rigid support structure; attaching a second display to the third portion of the flexible glass substrate or to the third rigid support structure; wherein: cold-forming the second portion of the flexible glass substrate to the second fixed shape; and fixing the second portion of the flexible glass substrate into the second fixed shape with the second rigid support structure is performed after fixing the third portion and attaching the second display, and while maintaining the third fixed shape of the third portion of the flexible glass substrate and the attached second display.

Aspect (14) of this disclosure pertains to the process of any one of Aspects (1) through (13), wherein the flexible glass substrate comprises a chemically strengthened glass.

Aspect (15) of this disclosure pertains to the process of any one of Aspects (1) through (14), further comprising applying at least one coating to the flexible glass substrate before fixing the first portion and attaching the first display, and while the flexible glass substrate is planar.

Aspect (16) of this disclosure pertains to the process of Aspect (15), wherein one of the at least one coatings is a decorative ink coating.

Aspect (17) of this disclosure pertains to the process of Aspect (15) or (16), wherein one of the at least one coatings is an antireflective coating.

Aspect (18) of this disclosure pertains to the process of any one of Aspects (1) through (17), wherein the flexible glass substrate is directly bonded to the first rigid support structure.

Aspect (19) of this disclosure pertains to the process of any one of Aspects (1) through (18), further comprising applying an adhesive to at least one of the first rigid support structure and the flexible glass substrate prior to bonding.

Aspect (20) of this disclosure pertains to the process of any one of Aspects (1) through (19), wherein the flexible glass substrate is bonded to the first rigid support structure using a method selected from roller tapes, mechanical retainers, press molding, or die molding.

Aspect (21) of this disclosure pertains to an article, formed by the process comprising: fixing a first portion of a flexible glass substrate into a first fixed shape with a first rigid support structure; attaching a first display to the first portion of the flexible glass substrate or to the first rigid support structure; after fixing the first portion and attaching the display, and while maintaining the first fixed shape of the first portion of the flexible glass substrate and the attached first display: cold-forming a second portion of the flexible glass substrate to a second fixed shape; and fixing the second portion of the flexible glass substrate into the second fixed shape with a second rigid support structure.

Aspect (22) of this disclosure pertains to an article, comprising: a cold-formed flexible glass substrate fixed into a non-planar fixed shape with a rigid support structure; a display attached to the cold-formed flexible glass substrate, wherein there is no residual stress between the display and the cold-formed flexible glass substrate.

Aspect (23) of this disclosure pertains to a process comprising: cold-forming a flexible glass substrate into a non-planar fixed shape; attaching the flexible glass substrate to a rigid support structure; and after cold forming and attaching the flexible glass substrate to a rigid support structure, attaching a display to the flexible glass substrate or to the rigid support structure.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

As used herein, "comprising" is an open-ended transitional phrase. A list of elements following the transitional phrase "comprising" is a non-exclusive list, such that elements in addition to those specifically recited in the list may also be present.

The term "or," as used herein, is inclusive; more specifically, the phrase "A or B" means "A, B, or both A and B." Exclusive "or" is designated herein by terms such as "either A or B" and "one of A or B," for example.

The indefinite articles "a" and "an" to describe an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

The term "wherein" is used as an open-ended transitional phrase, to introduce a recitation of a series of characteristics of the structure.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various needs as would be appreciated by one of skill in the art.

It is to be understood that the phraseology or terminology used herein is for the purpose of description and not of limitation. The breadth and scope of the present disclosure should not be limited by any of the above-described exemplary embodiments, but should be defined only in accordance with the following claims and their equivalents.

What is claimed is:

1. A glass article comprising:
a glass substrate comprising a first region, a second region, and a third region disposed between the first region and the second region; and
a rigid support structure attached to a surface of the glass substrate via an adhesive, wherein the rigid support structure is a single piece of material comprising:
a first frame portion attached to the surface at the first region, the first frame portion comprising a first opening over which the glass substrate extends;
a second frame portion attached to the surface at the second region, the second frame portion comprising a second opening over which the glass substrate extends; and
a third portion between the first frame portion and the second frame portion and attached to the surface at the third region such that the third region is fixed in a non-planar shape and the first and second regions of the glass substrate are not curved, wherein the support structure surrounds the first region and the second region.

2. The glass article of claim 1, wherein the adhesive is a structural adhesive.

3. The glass article of claim 1, wherein the glass substrate is chemically strengthened and comprises a depth of layer of 15 μm or greater.

4. The glass article of claim 3, wherein the glass substrate comprises a central tension of 18 MPa or greater and a surface compressive stress of greater than 500 MPa.

5. The glass article of claim 1, wherein the third portion of the rigid support structure comprises a concave surface to which the surface of the glass substrate is adhered.

6. The glass article of claim 1, wherein the rigid support structure is formed of one of a metallic material, a ceramic material, an alloy material, and reinforced plastic.

7. The glass article of claim 1, wherein the first region and the second region are rectangular-shaped.

8. The glass article of claim 1, wherein the glass substrate comprises a complex developable shape.

9. The glass article of claim 1, wherein the glass substrate comprises an open region that is not in direct contact with the rigid support structure, but surrounded by the rigid support structure.

10. The glass article of claim 1, further comprising at least one additional support structure disposed in at least one of the first opening and the second opening to maintain at least one of the first region and the second region in a fixed shape.

11. The glass article of claim 1, wherein the rigid support structure is configured to be attached to a part of an automobile.

12. The glass article of claim 1, further comprising one or more coatings applied to the glass substrate, the one or more coatings comprising at least one of a decorative ink coating and an antireflective coating.

13. A vehicle interior display comprising:

a cold-formed glass substrate comprising a first region, a second region, and a third region;

a support structure attached to a surface of the glass substrate, the rigid support structure comprising:

a first rigid support structure attached to the surface at the first region such that the first region is fixed in a first shape that is not curved, the first rigid support structure having (i) an inner boundary that defines a first opening and (ii) an outer boundary that defines a boundary of the first region;

a second rigid support structure attached to the surface at the second region such that the second region is fixed in a second shape that is not curved, the second rigid support structure having (i) an inner boundary that defines a second opening and (ii) an outer boundary that defines a boundary of the second region; and a third rigid support structure attached to the surface at the third region such that the third region is fixed in a third shape that is non-planar, wherein the third rigid support structure surrounds the first region and the second region;

a first flat display disposed behind the first region of the glass substrate within the first opening; and a second flat display disposed behind the second region of the glass substrate within the second opening, wherein the first and second regions are separated from one another by a portion of the third rigid support structure.

14. The vehicle interior display of claim 13, wherein the third rigid support structure is a single piece of material.

15. The vehicle interior display of claim 13, wherein the first flat display is adhered directly to the surface of the glass substrate within the first opening and the second flat display is adhered directly to the surface of the glass substrate within the second opening.

16. The vehicle interior display of claim 13, wherein the glass substrate is chemically strengthened and comprises a depth of layer of 15 µm or greater.

17. The vehicle interior display of claim 16, wherein the glass substrate comprises a central tension of 18 MPa or greater and a surface compressive stress of greater than 500 MPa.

* * * * *